United States Patent [19]
Philippe et al.

[11] Patent Number: 5,984,667
[45] Date of Patent: *Nov. 16, 1999

[54] COMBUSTION PROCESS AND APPARATUS THEREFORE CONTAINING SEPARATE INJECTION OF FUEL AND OXIDANT STREAMS

[75] Inventors: Louis C. Philippe, Oakbrook Terrace; Harley A. Borders, Lombard; Kenneth A. Mulderink, Countryside, all of Ill.; Pierre Bodelin, Vanves, France; Patrick Recourt, Margoussis, France; Lahoen Ougarane, Montingny le Bretonneux, France; Remi Tsiava, Grigny, France; Bernard Dubi, Velizy Villacoublay, France; Laurent Rio, Versailles, France

[73] Assignees: American Air Liquide, Inc., Walnut Creek, Calif.; L'Air Liquide, Societe Anonyme pour l'Etude et l'Exploitation des Procedes Georges Claude, Paris, France

[*] Notice: This patent is subject to a terminal disclaimer.

[21] Appl. No.: 08/668,758

[22] Filed: Jun. 24, 1996

Related U.S. Application Data

[63] Continuation-in-part of application No. 08/503,336, Jul. 17, 1995, abandoned.

[51] Int. Cl.⁶ ............................. F23D 14/84; F23D 21/00
[52] U.S. Cl. ......................... 431/175; 431/10; 431/165; 431/159
[58] Field of Search ................................. 431/8, 10, 285, 431/283, 164, 165, 174, 175, 178, 179, 159; 432/196, 20; 65/346, 196, 336, 337, 356, 136.3

[56] References Cited

U.S. PATENT DOCUMENTS

| | | |
|---|---|---|
| 1,899,926 | 3/1933 | Burke . |
| 1,931,927 | 10/1933 | Klees . |
| 1,950,046 | 3/1934 | Cone . |
| 2,003,943 | 6/1935 | Klees . |
| 2,149,980 | 3/1939 | Paret, Jr. . |
| 2,649,903 | 8/1953 | Russel . |
| 3,174,527 | 3/1965 | Reed et al. . |
| 4,378,205 | 3/1983 | Anderson . |
| 4,725,299 | 2/1988 | Khinkis et al. . |
| 5,267,850 | 12/1993 | Kobayashi et al. . |
| 5,299,929 | 4/1994 | Yap . |
| 5,302,112 | 4/1994 | Nabors, Jr. et al. . |
| 5,346,390 | 9/1994 | Slavejkov et al. . |
| 5,601,425 | 2/1997 | Kobayashi et al. . |

FOREIGN PATENT DOCUMENTS

| | | |
|---|---|---|
| 0335728 A3 | 10/1989 | European Pat. Off. . |
| 0687858 A1 | 12/1995 | European Pat. Off. . |
| 0 717 238 | 6/1996 | European Pat. Off. . |
| 0 717 240 | 6/1996 | European Pat. Off. . |
| 0 723 130 A1 | 7/1996 | European Pat. Off. . |
| 1074826 | 7/1967 | United Kingdom . |
| 1215925 | 12/1970 | United Kingdom . |

Primary Examiner—Carl D. Price
Attorney, Agent, or Firm—Jeffrey L. Wendt

[57] ABSTRACT

A burner assembly having improved flame length and shape control is presented, which includes in exemplary embodiments at least one fuel fluid inlet and at least one oxidant fluid inlet, means for transporting the fuel fluid from the fuel inlet to a plurality of fuel outlets, the fuel fluid leaving the fuel outlets in fuel streams that are injected into a combustion chamber, means for transporting the oxidant fluid from the oxidant inlets to at least one oxidant outlet, the oxidant fluid leaving the oxidant outlets in oxidant fluid streams that are injected into the combustion chamber, with the fuel and oxidant outlets being physically separated, and geometrically arranged in order to impart to the fuel fluid streams and the oxidant fluid streams angles and velocities that allow combustion of the fuel fluid with the oxidant in a stable, wide, and luminous flame. Alternatively, injectors may be used alone or with the refractory block to inject oxidant and fuel gases. The burner assembly affords improved control over flame size and shape and may be adjusted for use with a particular furnace as required.

7 Claims, 17 Drawing Sheets

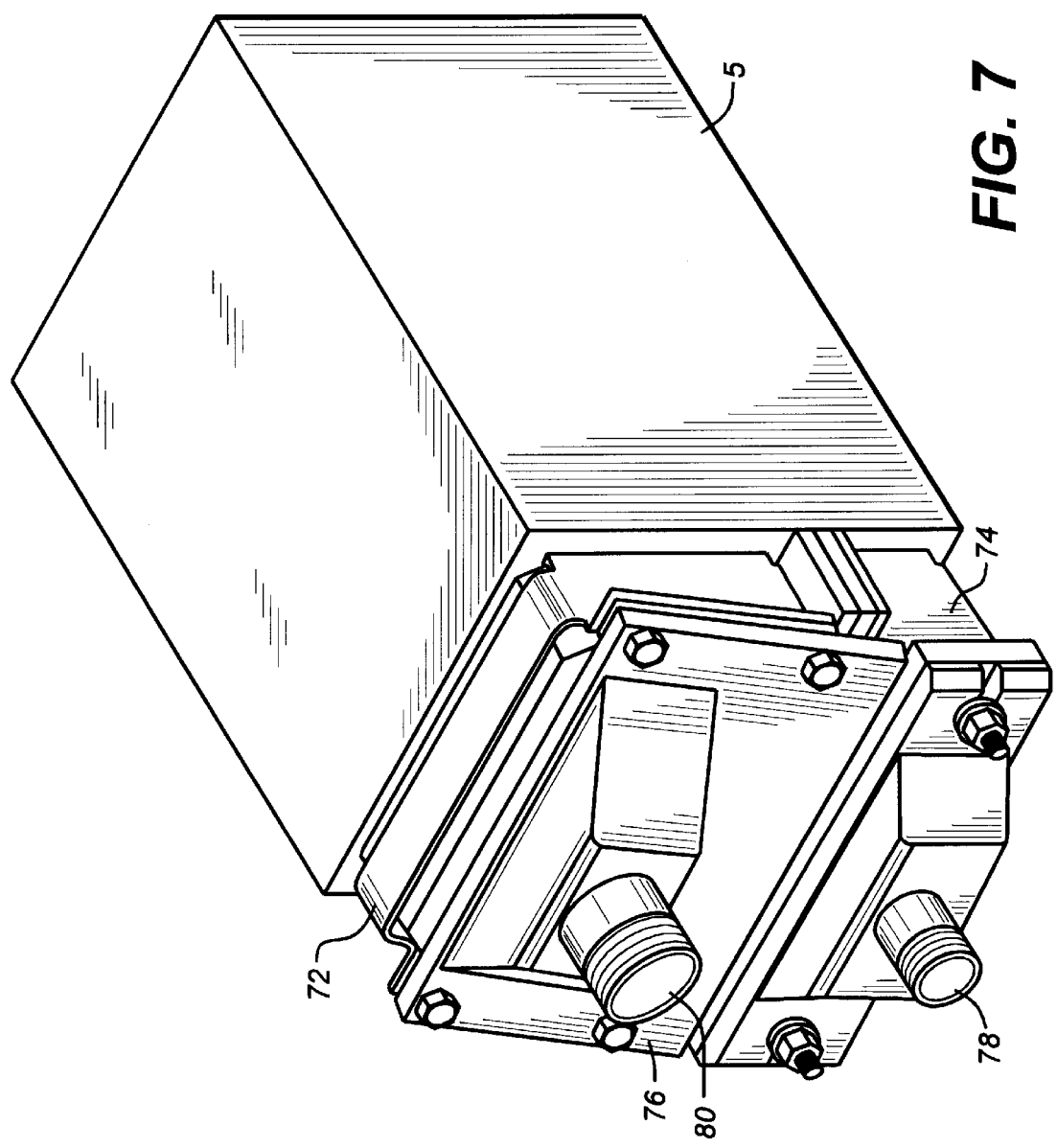

COMBUSTION PROCESS AND APPARATUS THEREFORE CONTAINING SEPARATE INJECTION OF FUEL AND OXIDANT STREAMS

CROSS-REFERENCE TO RELATED APPLICATIONS

This application is a continuation-in-part of assignee's patent application Ser. No. 08/503,336, filed Jul. 17, 1995 (now abandoned). This application is also related to Applicant's patent application Ser. No. 08/714,743, filed Sep. 13, 1996, which is a continuation of the present application. The present application is also related to Applicant's Ser. No. 08/756,126, filed Nov. 25, 1996.

BACKGROUND OF THE INVENTION

1. Field of the Invention

The present invention relates to a combustion process and an apparatus therefor containing separate injectors to introduce separately a fuel and an oxidant in the combustion chamber of a furnace, so that the fuel burns with the oxidant in a wide luminous flame, and whereby the combustion of the fuel with the oxidant generates reduced quantities of nitrogen oxides ($NO_x$)

2. Related Art

Industrial high temperature processes, such as glass or frit melting, ferrous and non ferrous materials smelting, use large amounts of energy to transform a variety of raw materials into a hot molten product, that is then casted, formed or otherwise disposed of in further stages of the industrial process. This operation is generally performed in large furnaces, that can produce as much as 500 tons per day of molten material. Combustion in the furnace of a fossil fuel, such as natural gas, atomized fuel oil, propane, or the like, with an oxidant that contains oxygen is a preferred method of supplying the energy. In some cases, the combustion is supplemented by electric heating. Most of the time, the fuel and the oxidant are introduced in the furnace through burners, in order to generate flames. The transfer of energy from the flames to the material to be melted results from the combination of convection at the surface of the material, and radiation to the surface or into the material if it is transparent to the radiation. Flames that are highly radiative (usually referred to as luminous flames), are usually preferred, because they provide better heat transfer and, thus, higher fuel efficiency.

For flame heating, it is also very important to have the energy from the flame evenly distributed above the surface of the material to be melted, Otherwise, hot and cold regions may co-exist in the furnace, which is not desirable The quality of products manufactured with material melted in such a furnace is often poor. For example, in a bath of molten glass, there may be glass stones in cold regions, and accelerated volatilization of glass in hot regions. Also, broad flames are preferred because they yield a better bath coverage.

In many countries, particularly the United States, increasingly stringent regulations are being promulgated regarding emissions of $NO_x$. It is, therefore, important to develop combustion techniques wherein $NO_x$ formation is limited. In very high temperature processes, $NO_x$ formation is promoted by long residence times of oxygen and nitrogen molecules in hot regions of the flame and the furnace. The use of substantially pure oxygen (about 90% $O_2$ or higher) instead of air as the oxidant has proven to be very successful in reducing the $NO_x$ emissions by as much as 90%, since all nitrogen is eliminated. However, substitution of air by substantially pure oxygen increases the flame temperature, and thus creates regions in the furnace where the reactivity of nitrogen with oxygen is high, and wherein the formation of $NO_x$ may proportionally increase, even though it is globally decreased when compared to combustion with air. Also, it is impossible in practice to eliminate all nitrogen from a furnace, because industrial furnaces are not tight to air leaks, the fuel usually contains some nitrogen, and oxygen supplied from non-cryogenic sources, such as oxygen produced by a Vacuum Swing Adsorption plant (VSA), contains a small residual nitrogen concentration.

Conventional methods of combusting fuel and oxygen for heating furnaces utilize post mix oxy-fuel burners. Conventional oxy-fuel burners have a metallic body with inlets for a fuel and an oxidant with a high concentration of molecular oxygen, and means to transport the streams with separate coaxially oriented channels to multiple injectors located at the burner tip. These burners generate high temperature flames with the shape of a narrow pencil at the burner tip, which needs to be located far enough into the furnace, to avoid or reduce overheating of the furnace walls. As a consequence of the high temperatures encountered in melting furnaces, one important drawback of these burners is the need for cooling, usually a jacket where a circulating fluid such as water provides the cooling. Such a burner is described, for example, in British Patent 1,215,925. Severe corrosion problems for the cooling jacket can arise particularly when the furnace atmosphere contains condensable vapors.

The gas cooled oxy-fuel burner is an improvement of the water-cooled burner. The body of the burner is protected from the furnace radiation by a refractory brick often referred to as a burner block, that possesses a substantially cylindrical cavity that opens into the furnace. The burner is usually mounted at the back of the cavity, and it usually contains concentric injectors of fuel and oxidant located in the cavity, recessed from the furnace inner wall. The brick and the burner are cooled by a peripheral annular flow of gas, usually the oxidant gas. Such burners are described e.g. in U.S. Pat. No. 5,346,390 and U.S. Pat. No. 5,267,850. With this type of burner, combustion starts in the burner block before reaching the furnace. Thus, the flame is confined in and directed by the cylindrical cavity as a narrow axisymmetric jet, and provides insufficient covering of the melt in the furnace, These flames have high peak temperatures and generate relatively large amounts of $NO_x$, because there is a direct contact between the oxygen and the fuel without dilution by the combustion products.

Another drawback of these gas cooled burners is that the flame may overheat and damage the furnace refractory wall because it starts in the wall itself. Also recirculation zones under the flame itself tend to accelerate refractory wear when the furnace atmosphere chemically reacts with the refractory material of the furnace wall which may reduce the furnace lifetime.

British Patent 1,074,826 and U.S. Pat. No. 5,299,929 disclose burners containing alternated multiple oxygen and fuel injectors in parallel rows in order to obtain a flatter Llame. Although this brings an improvement in terms of coverage of the melt, these burners still produce relatively large amounts of $NO_x$. Another drawback of these burners is that they are mechanically complex to build in order to obtain a flat flame.

It is also known to inject fuel and oxidant streams by separate, distinct injectors into a combustion chamber to generate flames detached from the furnace wall, with the aim of reducing refractory wear. One such apparatus is described in U.S. Pat. No. 5,302,112 wherein fuel and oxidant jets are injected at a converging angle into a furnace, which yields good mixing of the oxidant and fuel gases at the converging point of the two jets, thus enhancing the combustion rate but shortening the flame. However, the flame of such a burner has a high peak temperature and large quantities of nitrogen oxides are created in the furnace. To decrease this high peak temperature and significantly reduce formation of $NO_x$ it has been suggested in U.S. Pat. No. 4,378,205 to inject the fuel and/or the oxidant jets at very high velocities and to use separate injections of fuel and oxidant gases wherein the fuel and/or the oxidant jets entrain combustion products contained in the furnace atmosphere, and are diluted before the actual combustion between the fuel and the oxidant. However, the flames generated by these burners are almost invisible, as disclosed therein, col. 9, lines 58–65. It is, thus, extremely difficult for a furnace operator to determine and/or control the location of the combustion zones, and whether or not the burner apparatus is actually turned on, which may be hazardous. Another drawback of this burner is that the entrainment of combustion products promotes strong recirculation streams of gases in the furnace, which in turn accelerates the wear of the refractory walls of the furnace. Also, the use of high velocity oxidant jets requires the use of a high pressure oxidant supply, which means that the oxidant gas needs to be either produced or delivered at high pressure (the fuel gas is usually at relatively high pressure) or that the oxidant gas, such as the low pressure oxygen gas usually supplied by a VSA unit, has to be recompressed before being injected into the furnace.

Burners in use today typically are only designed to use gaseous fuel or liquid fuels (perhaps by spray of the liquid fuel), but cannot burn both types of fuel simultaneously, or switch easily from gaseous fuel to liquid fuel.

Liquid fuels present their own problems to the combustion artisan. The liquid fuel is typically atomized, and there are several different techniques available for the atomization of liquid fluids. The object is to produce jets of liquid fluid droplets (also called "spray") which have defined geometric characteristics. The usual liquid fuels are not particularly flammable in the liquid state: only in the gaseous state are they able to support an oxidation reaction sufficiently rapid to give rise to the appearance of a flame. When one wishes to obtain stable flames with fuels that are liquid or viscous at ambient temperature, the principal difficulty is thus to "shrewdly condition" this liquid in such a way that it evaporates rapidly in order to support oxidation reactions in the interior of the flame.

The method currently used to achieve this "shrewd conditioning" consists of atomizing the fuel in the form of droplets: thus, for a given quantity of fuel, this makes possible a substantial increase in the amount of liquid surface exposed to the oxidant (the smaller the drops are, the greater will be the interfacial surface—the site of evaporation).

In simplified terms there are three major methods for achieving atomization of a liquid:
1. rotating cup atomization involves shredding the fluid with the air of a moving mechanical element.
2. in mechanical atomization the fuel is compressed to very high pressures (15 to 30 bars), thus imparting to it a high kinetic energy. This energy results in shearing of the liquid when it is brought into contact with the exterior atmosphere and thus results in the formation of droplets.
3. gaseous-fluid-assisted atomization can be used to arrive at a similar result while achieving a saving on high pressures (2 to 6 bars).

In simplified terms one can distinguish two types of gaseous-fluid-assisted atomization according to whether the liquid fuel and atomizing fluid are brought into contact inside or outside the atomizer head. These types may be referred to as internal atomization and external atomization.

Internal atomization is characterized by confinement of the liquid fuel and atomizing fluid in an emulsion chamber. The mode of introduction of the two fluids into this chamber can vary considerably and has a direct influence on the characteristics of the emulsion that exits from the chamber. Likewise, the internal geometry of this chamber (overall volume, vanes for producing rotation, number and diameters of the inlet and outlet orifices, and so forth) also affects the specific characteristics of the fuel/atomizing fluid mixture to be burned.

This mode of atomization generally affords an excellent quality of atomization, that is, an emulsion composed of very small particles with a very narrow particle size distribution about these small diameters. At a given fuel delivery rate, this emulsion quality is naturally a function of the atomizing fluid delivery rate employed and the pressure level prevailing in the interior of the atomizing chamber.

For external atomization, where contact between the two phases takes place outside of any confining enclosure, the emulsion is created mainly by shearing of the jet of liquid fuel by the atomizing fluid. The geometry of the outlets for the two fluids completely determines the quality of the atomization, and particle size analysis of the drops resulting from the contact shows a relatively wide diameter distribution (simultaneous presence of small and large particles).

In the field of liquid fuel atomization, the principal known priority for the invention is published European Patent Application No. 0687858 A1, which claims an external atomization device that produces a very narrow spray angle (less than 15°). This published application in particular claims that to successfully achieve this specific characteristic the angle formed between the atomizing fluid and the liquid fuel must be between 5° and 30°.

Another disclosed liquid fuel atomization device is the one disclosed in European Patent Application No. 0335728 A2, which claims a device for the introduction of a fluid into a combustion enclosure through the expedient of several distinct conduits branching from a common main conduit.

A need exists for a burner which may operate at low pressure, particularly for the oxidant gas, while producing a wide, flat luminous flame with reduced $NO_x$ emissions, and which affords a manner of controlling flame length so as to adapt the flame to the furnace in which it is used. There also exists a need in the art for a burner having the capability of burning gaseous fuels and liquid fuels, either at the same time or in the alternative. There is a need in the combustion art for a liquid fuel atomizer that falls within the scope of the third mode of atomization, a complete device that makes possible a controlled fluid introduction into the combustion zone that is a two-phase mixture of atomizing gas and droplets of liquid fuel, wherein atomization takes place outside of the nozzle (external atomization) and yet permits forming distinct spray jets having high relative angles (5° to 30°). In particular the combustion art is desirous of a device for atomization of a liquid fuel using a gaseous fluid and the application of this device to a burner such as the burner assemblies described herein.

SUMMARY OF THE INVENTION

In accordance with the present invention, methods and systems for combustion of a fuel with oxygen contained in an oxidant gas are presented, wherein the fuel and oxidant gas are injected in separate fluid streams into a combustion chamber of a high temperature furnace (having a temperature of at least, 820° C. or 150° F.) in such proportions that the molar ratio of oxygen in the oxidant flow to fuel flow is between about 0.95 and about 1.05 (stoichiometric ratio), the fuel and oxidant producing a wide, luminous, well-defined flame. Methods and systems of the present invention generate reduced quantities of $NO_x$.

In general, the inventive burner assembly comprises at least one fuel fluid inlet and at least one oxidant fluid inlet, means for transporting the fuel fluid from the fuel inlet to a plurality of fuel outlets, the fuel fluid leaving the fuel outlets in fuel streams that are injected into a combustion chamber, means for transporting the oxidant fluid from the oxidant inlets to at least one oxidant outlet, the oxidant fluid leaving the oxidant outlets in oxidant fluid streams that are injected into the combustion chamber, with the fuel and oxidant outlets being physically separated, and geometrically arranged in order to impart to the fuel fluid streams and the oxidant fluid streams angles (referred to herein as "final" angles) and velocities (as the fuel and oxidant enter the combustion chamber) that allow combustion of the fuel fluid with the oxidant in a stable, wide, and luminous flame, Thus, one aspect of the invention is a burner assembly having improved flame length and shape control, comprising:
 a refractory block adapted to be in fluid connection with sources of oxidant and fuel, the refractory block having a fuel and oxidant entrance end and a fuel and oxidant exit end, the exit end having fuel exits and oxidant exits, the refractory block further having a plurality of fuel cavities, at least two of the fuel cavities defining a first fuel plane, and a plurality of oxidant cavities defining a second oxidant plane, the fuel cavities being more numerous than the oxidant cavities.

Preferred are burner assemblies of this aspect of the invention wherein the oxidant exits are larger than the fuel exits, and embodiments wherein one or more cavities has therein an injector positioned therein, as defined herein.

Preferred refractory blocks have at least five cavities, three cavities at a lower portion thereof for injection of fuel into a furnace combustion chamber, and two cavities at an upper portion thereof for injection of an oxidant into a furnace combustion chamber.

Alternatively, especially in the case when liquid fuels such as fuel oil is used as the fuel, the oxidant cavities are preferably more numerous than the fuel cavities.

In a particularly preferred embodiment (a so-called "bi-fuel" embodiment), the refractory block has at least one liquid fuel cavity and at least one gaseous fuel cavity. In these embodiments, it is preferred that the liquid fuel cavity be positioned below that gaseous fuel cavities, and the gaseous fuel cavities positioned below the oxidant cavities, as further described herein.

Preferably, the fuel and oxidant exits are circular and contoured. The cavities are preferably straight holes through the refractory block form a fluid entrance end of the block to a fluid exit end of the block. The burner assembly of the invention may in some preferred embodiments comprise a fuel distributor or atomizer which is a single, integral component which fits inside a cavity of the refractory block, the fuel distributor having multiple fuel exits.

Another burner assembly embodiment of the invention is that comprising a refractory block having a fuel and oxidant entrance end and a fuel and oxidant exit end, and further having a single liquid fuel cavity and a plurality of oxidant cavities, the oxidant cavities defining an oxidant plane which is positioned at an upper portion of the refractory block and above the liquid fuel cavity.

Yet another burner assembly of the invention comprises a refractory block having a fuel and oxidant entrance end and a fuel and oxidant exit end, and further having a plurality of fuel cavities and a plurality of oxidant cavities, at least two of the oxidant cavities defining a first oxidant plane which is positioned at an upper portion of the refractory block and above a portion of the fuel cavities defining a fuel plane, wherein at least some of the oxidant cavities form a second plane at a position lower in the refractory block than the first oxidant plane, and wherein at least one of the oxidant cavities in the second oxidant plane has positioned therein a fuel injector having a diameter smaller than its corresponding oxidant cavity.

Another burner assembly embodiment of the invention comprises a refractory block having a fuel and oxidant entrance end and a fuel and oxidant exit end, and further having a plurality of fuel cavities and a single oxidant cavity, said oxidant cavity positioned at an upper portion of the refractory block and above a portion of the fuel cavities defining a fuel plane. The oxidant cavity itself (cross-section) and its exit may be non-circular, such as rectangular, oval, ellipsoidal, and the like, in all cases preferably with contoured edges at the block exit face as described herein.

Another burner assembly of the invention comprises:
 a) at least two fuel injectors defining a first plane;
 b) at least one oxidant injector;
 c) a wall through which the oxidant and the fuel injectors protrude into a combustion chamber, the injectors removably secured in the wall;
wherein the oxidant injectors are positioned at a converging angle toward the first plane in the combustion chamber ranging from about 0° to about 15°.

Another aspect of the invention is a method of combustion of a fuel with an oxidant, the method comprising:
 a) providing a supply of an oxidant fluid stream;
 b) injecting the oxidant fluid stream into a combustion chamber to create at least one injected oxidant fluid stream;
 c) providing a supply of a fuel fluid stream;
 d) injecting the fuel fluid stream into the combustion chamber to create at least two injected fuel fluid streams;
 e) creating a substantially planar sheet of fuel fluid in the combustion chamber by injecting the at least two injected fuel fluid streams into the combustion chamber, at least two of the injected fuel fluid streams being substantially located in a first fuel plane;
 f) intersecting the oxidant fluid stream with the sheet of fuel fluid in the combustion chamber; and
 g) combusting the fuel fluid with the oxidant fluid in the combustion chamber.

In preferred processes in accordance with the invention, two adjacent fuel fluid streams have a final diverging angle which is not greater than about 15°. Other preferred methods are those wherein gaseous and liquid fuels are burned simultaneously, and methods wherein gaseous fuel (or liquid fuel) is burned first, followed by liquid fuel (or gaseous fuel).

It has been discovered that when the oxidant flow cavities are arranged in a diverging fashion the flame is wider. In some embodiments, the flame breadth can be increased (without significant decrease in the flame length) by providing the fuel and/or oxidant flow cavities with a final divergence angle slightly more than their initial divergence angle, as further described herein. Also, in some preferred embodiments, oxidant and fuel injectors are used (especially for fuel) which fit inside the fuel and/or oxidant cavities.

Other embodiments of the method and apparatus of the invention include the provision of different distances between oxidant cavities and fuel cavities, depending on the type of fuel being burned (for example gaseous fuel vs. liquid fuel); non-parallel oxidant cavities (i.e. having diverging angles); and the provision, especially for fuel oil purposes, of a fuel injector having multiple diverging fuel sub-injectors, the fuel injector being located in one cavity of the refractory block.

Further aspects and advantages of the invention will become apparent after review of the following description and claims.

BRIEF DESCRIPTION OF THE DRAWING

FIG. 7 illustrates a perspective view of one burner assembly embodiment of the present invention;

FIG. 13c is a side elevation view of an alternate design for the refractory block of FIG. 13a;

DESCRIPTION OF PREFERRED EMBODIMENTS

I. General Aspects

Figure 1:
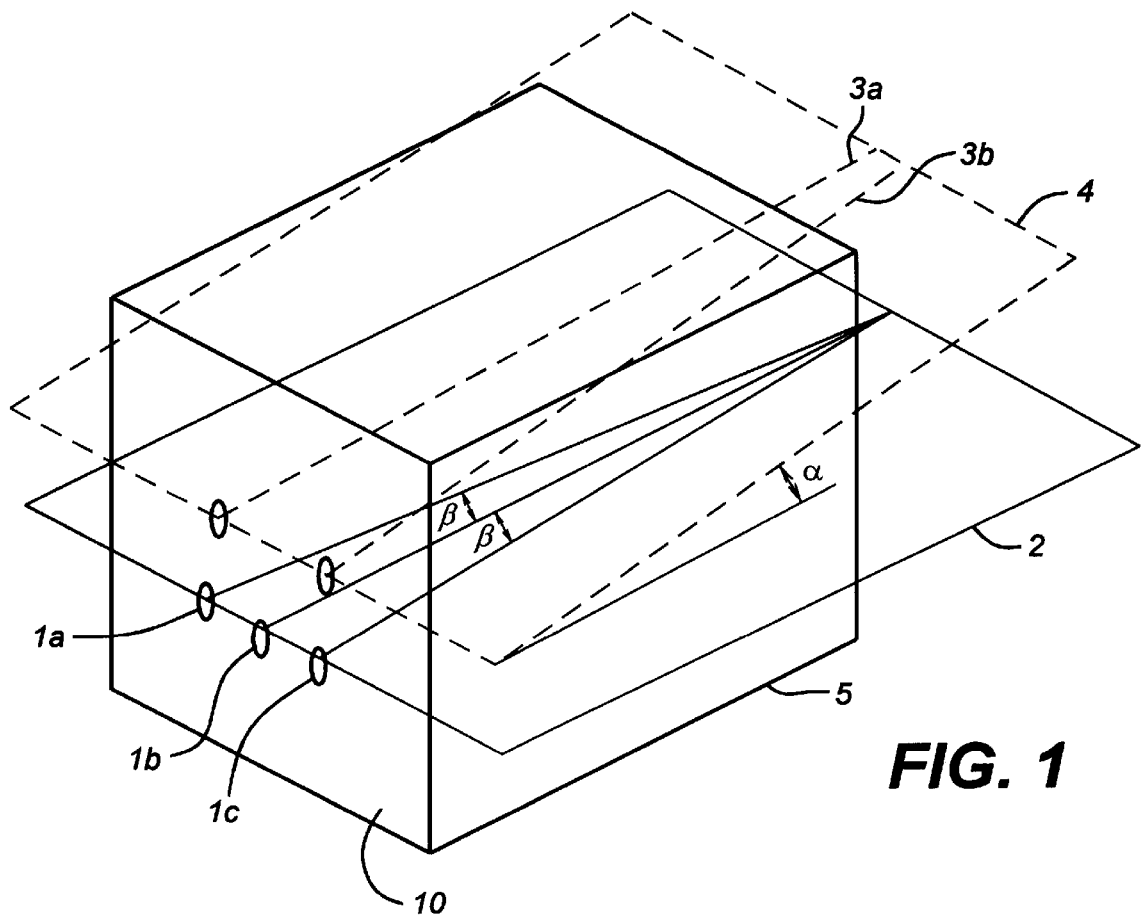
FIG. 1 illustrates one embodiment of a refractory block component of a burner assembly of the present invention, wherein the fuel "sheet" is made by using three (3) fuel injectors located in a first plane, and wherein the oxidant is supplied by two (2) injectors located in a second plane.

According to one aspect of the present invention, the combustion process and apparatus therefor are provided which operates with low oxidant supply pressure, such as the pressure delivered by a vacuum swing adsorption oxygen production unit, Low oxidant pressure means a pressure ranging from about 105,000 to about 170,000 Pa (absolute pressure) (50 m bar to 0.7 bar/relative pressure).

According to the present invention, the fuel and the oxidant are introduced in the furnace through separate cavities in the burner assembly. The term "fuel", according to this invention, means, for example, methane, natural gas, liquefied natural gas, propane, atomized oil or the like (either in gaseous or liquid form) at either room temperature (about 25° C.) or in preheated form. The term "oxidant", according to the present invention, means a gas with an oxygen molar concentration of at least 50%. Such oxidants include oxygen-enriched air containing at least 50% vol., oxygen such as "industrially" pure oxygen (99.5%) produced by a cryogenic air separation plant or non-pure oxygen produced by e.g. a vacuum swing adsorption process (about 88% vol. $O_2$ or more) or "impure" oxygen produced from air or any other source by filtration, adsorption, absorption, membrane separation, or the like, at either room temperature (about 25° C.) or in preheated form.

The cavities, as defined herein, are passages through a ceramic block or through a furnace wall, and preferably have a generally cylindrical cross section. Any equivalent cross section can be used, such as square, rectangular, ellipsoid, oval, and the like. Injectors are defined herein as tubular members having an outer shape which mates with its respective cavity, and which can be placed in its respective cavity to prolong the use of the refractory burner block. Injectors can be either metallic tubes, metallic tubes or pipes with ceramic ends, ceramic tubes, or a combination thereof. Examples of suitable ceramic materials for injector tubes include alumina, zirconia, yttria, silicon carbide, and the like. Various stainless steels may be used for the injectors if the injectors are metallic, and metallic injectors having heat-protective refractory coatings, employing materials such as those mentioned for ceramic injectors, are also possible.

Injectors are preferred but not absolutely necessary. For example, injectors would not be necessary if the cavities are covered or coated with a layer of ceramic or any other material which withstands the high temperature and has adequate non-porosity to avoid penetration of gas through the refractory block The injectors are installed in cavities opened through the furnace walls, or through a refractory or ceramic brick mounted in the furnace wall. In some embodiments, the length of the injector is purposely made insufficient to span the respective length of its cavity in the burner block: the fuel or oxidant flows from the injector into the cavity, then from the cavity into the combustion chamber of the furnace. Thus, in some embodiments, the injector stops before any change in direction of the gas flow that can be imparted by the geometry of the cavity; in other embodiments, the injector may protrude out of the refractory block and into the combustion chamber. In other embodiments there may be no injectors at all.

The fuel injection is preferably made by at least two, preferably identical, cavities which axis are located preferably in a same plane, further referred to as the first fuel plane. The fuel and oxidant outlets are physically separated and geometrically arranged in order to impart to the fuel fluid streams and the oxidant fluid streams angles and velocities that allow combustion of the fuel fluid with the oxidant in a stable, wide, and luminous flame.

In preferred embodiments, the fuel cavities diverge at an initial angle, and then this initial divergence angle increases slightly just before the fuel enters the combustion chamber to the final divergence angle. This final divergence angle is preferably only a few degrees larger than the first divergence angle. A preferred final angle between two adjacent fuel cavities is between about 3 and 10 degrees. The distance 1 between the extremities of the cavities when the fuel enters the combustion chamber of the furnace is comprised preferably between about 4 and 10 times the inner diameter d of each fuel injector in the first plane. The first plane is preferably but not necessarily parallel to the melt surface. When the fuel injector or cavity is not circular, the dimension "d" is an equivalent diameter corresponding to the cross-sectional area of an equalivalent circular injector or cavity. The combination of the fuel jets from the fuel cavities is such that it creates a fuel "sheet". By fuel "sheet", it is meant a substantially continuous cloud of fuel droplets (if liquid) or fuel gas in an angle of the first plane of at most about 120°, preferably between about 20° and 60°, and preferably about symmetrical relative to the longitudinal axis of symmetry of the fuel cavities. The velocity of the fuel gas in the cavities is preferably at least about 15 m/s.

According to one preferred embodiment of the present invention, a process is provided wherein a "sheet" of fuel fluid is generated above the surface to be heated, e.g. by means of at least two fuel cavities that make a final diverging angle preferably smaller than about 15 degrees, said fuel cavities being located in a first plane, an oxidant fluid having a lower velocity than that of the fuel fluid (preferably not exceeding about 60 meters per second (m/s)) being injected above the surface to be heated, preferably with at least two oxygen cavities, two adjacent oxygen cavities making a final diverging angle smaller than about 15 degrees. These cavities are preferably located in a second plane, which converges to and intersects with the first plane in the combustion chamber. The low velocity oxidant fluid jets which intersect with the fuel sheet, are dragged by the fuel flow along the fuel sheet, and create a combustion zone that stretches along the "sheet". Accordingly, at the beginning of the combustion zone of the combustion chamber, a fuel-rich region is maintained at the underside of the fuel cloud where significant amounts of soot are formed. The soot and the fuel are then progressively oxidized by the oxidant that diffuses along the combustion zone.

According to a particular embodiment of the invention, a method of combustion in a combustion zone is provided for a burner assembly containing at least two fuel fluid cavities, at least one oxidant fluid cavity and at least one exit face at which the fuel fluid cavities and oxidant fluid cavity terminates, the process entailing:

providing a supply of an oxidant fluid stream;

injecting said oxidant fluid stream through said at least one oxidant fluid cavity to create at least one injected oxidant fluid stream;

providing a supply of a fuel fluid stream;

injecting said fuel fluid stream through said at least two fuel fluid cavities to create at least two injected fuel fluid streams;

creating a substantially planar sheet of fuel fluid by injecting the at least two injected fuel fluid streams with a final diverging angle, at least two injected fuel fluid streams being substantially located in a first fuel plane;

intersecting the oxidant fluid stream with the sheet of fuel fluid in the combustion zone; and combusting the oxidant fluid with the fuel fluid in the combustion zone.

Additionally, the invention also provides stabilization of the flame with an auxiliary injection of fuel and/or oxidant gases.

According to another embodiment of the invention, it is possible to also have additional fuel cavities, e.g. located in a second fuel plane, beneath the first fuel plane and preferably parallel to or slightly converging with the first fuel plane.

The injection of the oxidant fluid is made by at least two, preferably identical, cavities whose axis are located in the same plane, namely a first oxidant plane. The axial distance L between the tips of the oxidant cavities where the oxidant flow enters the combustion chamber of the furnace is comprised preferably between about 2 and about 10 times the inner diameter D (or equivalent diameter, as defined previously for "d") of each oxidant injector in the second plane. Two adjacent oxidant cavities make a final diverging angle (in the direction of the flow) between about 0 and 15 degrees, preferably between about 0 and 7 degrees. The oxidant velocity in the cavities is smaller than the fuel velocity in the cavities of the first oxidant plane, and preferably smaller than about 60 meters per second (m/s). In some embodiments of the invention, the oxidant cavities contain so-called swirlers, intended to give to the oxidant streams a swirling motion to increase the spreading of the oxidant streams in the combustion zone, and improve the mixing between the oxidant and the fuel sheet. Suitable swirlers are metallic fins or twisted stripes of metal placed in the cavities or injectors.

The total quantities of fuel and oxidant used by the combustion system are such that the flow of oxygen ranges from about 0.95 to about 1.05 of the theoretical stoichiometric flow of oxygen necessary to obtain the complete combustion of the fuel flow. Another expression of this statement is that the combustion ratio is between 0.95 and 1.05.

The angle a between the first fuel plane and the second (oxidant) plane is between about 0 and 20 degrees, the first fuel plane and second plane converging toward the combustion chamber. The distance h between the first fuel plane and the second plane is at least equal to 2 times the diameter D, in the vertical plane at the exit of the cavities, with the first fuel plane being considered as substantially horizontal.

The present invention also relates to a burner assembly comprising at least two fuel fluid cavities, at least one oxidant fluid cavity and at least one exit face at which the fuel fluid cavities and the oxidant fluid cavity terminates, comprising:

means for supplying an oxidant fluid stream;

means to inject said oxidant fluid stream in said at least one oxidant fluid cavity to create at least one injected oxidant fluid stream;

means for supplying a fuel fluid stream;

means to inject said fuel fluid stream in said at least two fuel fluid cavities to create at least two injected fuel fluid streams;

wherein the directions of injection of the oxidant fluid stream and the fuel fluid stream are substantially converging while the directions of at least two adjacent fuel fluid channels are diverging.

A first refractory block component 5 of a burner assembly embodiment of the invention is illustrated in FIG. 1, having three fuel fluid cavities 1a, 1b, and 1c in a first plane 2, and two oxidant fluid cavities 3a and 3b in the second plane 4. The two first and second planes (2 and 4) make an angle α. The three fuel fluid cavities 1a, 1b, and 1c make an angle α between two adjacent ones, preferably the same. Preferably, the axis of the middle fuel cavity 1b is perpendicular to an exit face 10 of refractory block 5.

Figure 2:
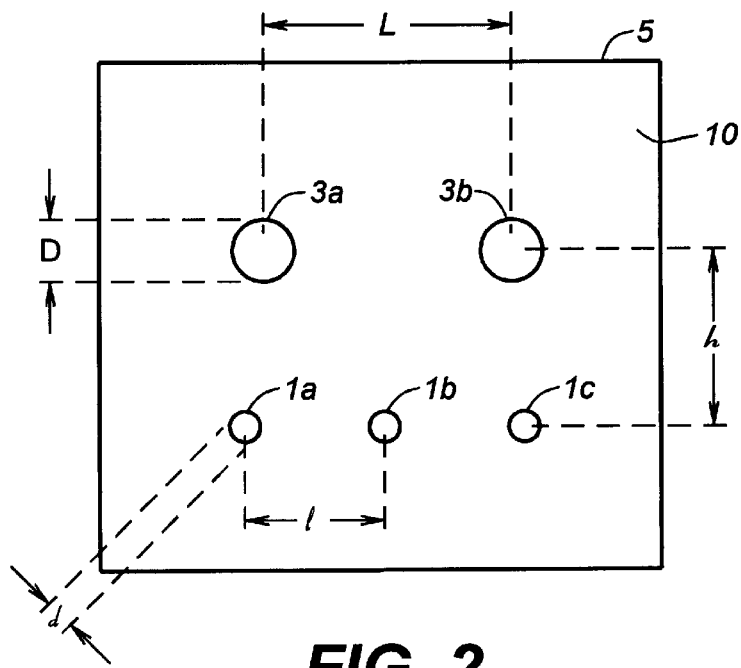
FIG. 2 is a front view of the arrangement of FIG. 1.

FIG. 2 illustrates a front view of block 5 of FIG. 1. On FIG. 2, d represents the diameter of fuel cavities 1a, 1b, and 1c at exit face 10; 1 represents their respective axial Separation distance at exit face 10; D represents the diameter of oxidant cavities 3a and 3b at exit face 10; and L their respective axial separation distance at exit face 10. "h" represents the distance between planes 2 and 4 at exit face 10 of block 5. It is to be recognized that all dimensions described herein with reference to FIG. 2, may be modified based on the particular fuel used. For example, if fuel oil is used, the distance h would tend to be greater than if natural gas were used as the fuel.

Figure 3:
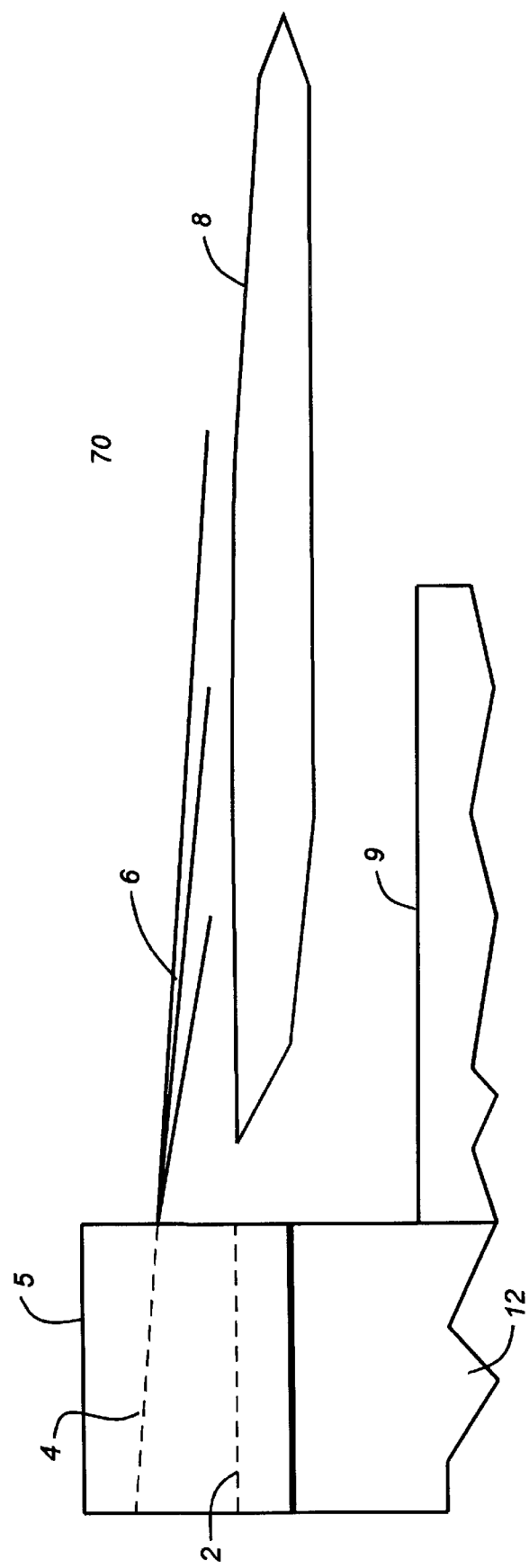
FIG. 3 is a schematic side view of the combustion process that occurs in a furnace when the configuration of FIG. 1 or 2 is used.
Figure 4:
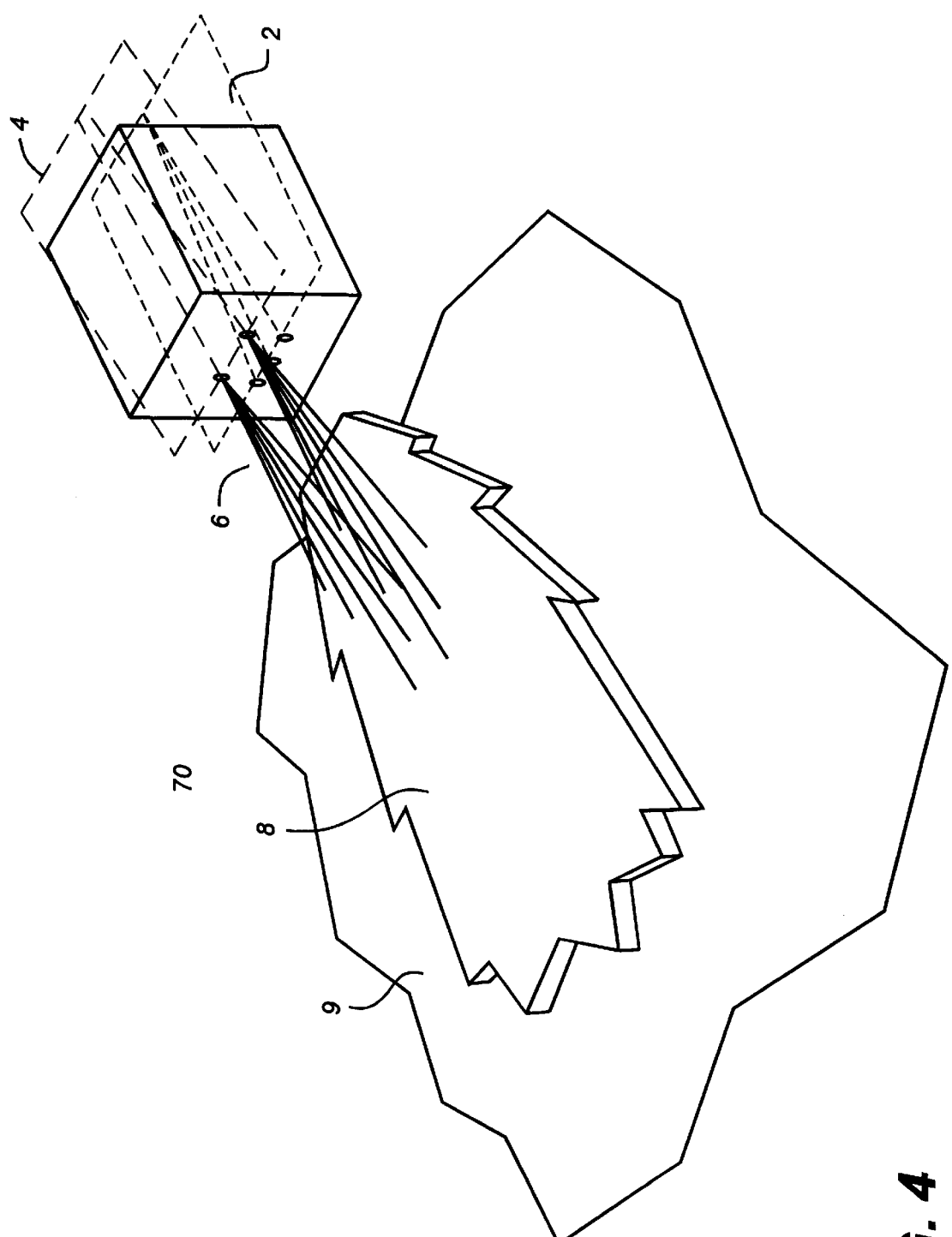
FIG. 4 is a top view of the process of FIG. 3.

FIG. 3 represents a schematic side elevation view of the operation of the combustion system of FIGS. 1 and 2 as used in, for example, a glass melting tank 12, while FIG. 4 illustrates a perspective view of the system of FIGS. 1–3. A fuel "sheet" or "cloud" is formed by fuel fluid streams exiting the fuel cavities in the first plane 2. Jets of oxidant 6 exit the cavities of the second plane 4, and intersect the fuel sheet in the combustion chamber 70 of the furnace. Combustion of the fuel with the oxidant occurs at an interface between the two flows to generate a flame 8 above the melt 9. In the early stages of the combustion process, the region located under the flame is fuel rich, which promotes the formation of carbon particles (soot) and thus enhances the luminosity of the flame. This is one of the characteristics of the invention: by spreading the fuel in a plane and creating planar layer or a "sheet" all over the melt substantially parallel to the melt and directing oxygen from above into the direction of the "sheet" to intersect the "sheet", then combustion preferably occurs in between the oxidant fluid and the fuel fluid where they cross each other. Before the intersection of the planes, the flow is stratified, the bottom portion of the flame (which is closer to the melt) being fuel rich and thus generating soot because of the excess amount of fuel which is cracked by the high temperature flame. This soot is entrained by the gaseous stream beyond the intersection of the planes, to be further reburned in the flame which is thus more luminous.

The configuration illustrated in FIGS. 1 to 3 was tested in a pilot scale furnace of square cross section (1 m wide and 2.5 meters long). The furnace was heated up to 820° C. (1500° F.) by an assist oxygen natural gas burner. When the furnace temperature was high enough, the combustion system of the invention was started and the assist burner shut down. The flame was viewed from the side of the furnace which had viewing ports. When necessary, the burner assembly including the refractory block illustrated in FIG. 1 was rotated (e.g. by 90 degrees), so that the flame could be better monitored from the side viewports, In all experiments, the first plane of the natural gas cavities was parallel to one of the furnace walls (side or bottom).

The combustion system that was tested used natural gas flowing at about 32 nm$^3$/hr (1200 scfh) as a fuel fluid and pure oxygen flowing at about 64 nm$^3$/hr (2400 scfh) as the oxidant fluid under a pressure of about 100 m bar above the furnace pressure. This represents a combustion ratio of about 1. The distance L between the oxygen cavities was 15 cm. The angle between the natural gas cavities was 5 degrees. The arrangement allowed to vary the distance h between the first plane and the second plane from 2.5 cm to 10 cm, and the relative angle of the two oxygen cavities from 0 to 5 degrees. The cavities included injectors made of ceramic mullite tubes (stainless steel tubes have been further tested too). All cavities were mounted in cavities drilled through refractory material (referred to as the refractory block 5). The diameter of the natural gas cavities was varied between 0.925 cm and 1.58 cm (0.364 inches and 0.622 inches) so that fuel fluid velocities of 44 m/s, 26 m/s, and 16 m/s, were respectively achieved. The diameter of the oxygen cavities was varied between 1.9 and 2.66 cm (0.75 and 1.049 inches) so that oxygen velocities of 16 m/s, 27 m/s, and 31 m/s were achieved. The CO, $O_2$, $CO_2$, $NO_x$ contents in the flue gases were continuously monitored. Similar conditions with excess oxygen and furnace leaking (air ingress) were maintained during all the tests so that the $NO_x$ emissions from the various configurations can be compared. The average furnace temperature was about 1450° C. for all the tests. A sampling probe was also introduced in the furnace, at a distance of two meters from the block 5 to measure the local CO concentration in the flame. Low measured CO concentrations at the sampling probe indicate short flames. Another indication of short flames for this particular furnace is the observation of relatively low temperature flue gases, with about the same stoichiometric conditions.

Also tested in the pilot furnace was an oxygen-natural gas burner of the post mix type, with a generic "tube in tube" design: injection of natural gas surrounded by an annular oxygen stream. This burner was used as a reference, The burner was attached to the furnace wall, and generated 500 ppm of $NO_x$ in the flue gases.

For the system according to the invention, when the distance h was equal to 2.5. cm and the angle between the two planes was equal to 0 degree, a stable flame was generated, detached from the burner block. There was evidence of very good mixing between the fuel and oxygen jets. The flame length was short (1.5 m), especially when the velocity of the fuel was 2 to 4 times the velocity of the oxygen. The $NO_x$ concentration was about 400 ppm. The flame appeared to be slightly broader than the reference flame.

As the distance h was increased (still maintaining α=0°), the mixing between natural gas and oxygen was delayed, and some soot was formed in the flame. At h=8 cm, the flame appeared very voluminous and very long. Large amounts of soot were observed on the water cooled sampling probe at 2 meters from the burner block in which the burner is installed. The flame was visible, but its boundaries were hard to define because the flame was unstable. The furnace pressure exhibited important pressure fluctuations due to this instability. The $NO_x$ emissions were dramatically reduced to about 60 ppm. Although the quality of the combustion seemed relatively poor, there was no CO left in the flue gases.

At h=8 cm, an improvement of the flame stability was obtained when the angle between the first and the second planes was increased to 5°, 10°, and 20°. The angle $\alpha=20°$ gave the best stability. Increasing a beyond 20° did not significantly reduce the amount of soot formed and the flame luminosity, did not reduce the flame width, but increased the NOx concentration in the flue gases, and decreased the flame length. Also the impingement of the oxygen jets on the fuel sheet at the angle of 20°, even when the oxygen velocity was reduced, modified the shape of the "sheet", and deflected it towards the wall parallel to the first plane, which was found to be undesirable. The flame could be considered as being stable or very stable (for h=8 cm) for an angle comprised between about 5° and 15°.

In a given configuration, increasing the ratio of natural gas velocity to oxygen velocity improved the flame stability. For example the configuration where $\alpha=10°$ and h=8 cm is stable when the fuel velocity is 70 m/s and the oxygen velocity is 16 m/s. However, the stability effect is detrimental to the flame length and luminosity. The larger natural gas velocity was obtained by closing the natural gas injector located in the center of the first plane, so that all the natural gas was flowing through the two outer natural gas cavities.

Figure 5:
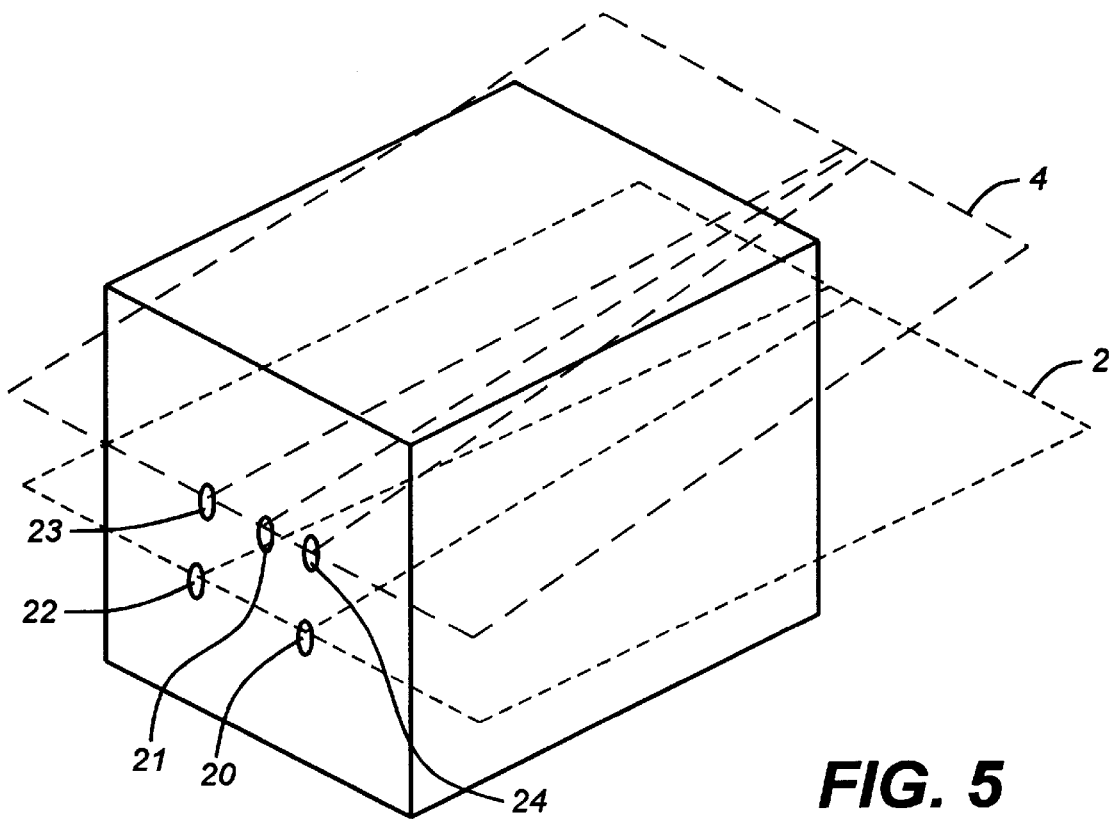
FIG. 5 illustrates a second burner assembly embodiment of the present invention, where the fuel "sheet" is formed by using two fuel cavities in a first fuel plane, the oxidant being supplied by two cavities in a second plane, and flame stabilization being supplied by an auxiliary fuel Injection in the second plane.

It has been unexpectedly found, however, that the flame stability could be significantly improved without affecting the flame luminosity and the flame length if one natural gas injector is located in between the two oxygen cavities of the second plane, such as indicated on FIG. 5, preferably if one of the natural gas injector 21 in the first plane 2 is moved to the second plane 4, or close to it, substantially at the same distance from each oxygen injector 23, 24. The other two fuel cavities 20, 22 keep the same position. Most preferably, if three gas cavities 20, 21, 22 and two oxygen cavities 23, 24 are provided, it is preferred to have two natural gas cavities 20, 22 in the first plane 2, two oxygen cavities 23, 24 in the second plane 4 and a third natural gas injector 21 located close to or in the second plane 4, preferably at substantially the same distance from the fuel cavities, said distance being preferably smaller than or preferably at most equal in the distance from the two oxygen cavities. Approximately one third of the natural gas flow may be diverted from the first plane 2 to improve the flame stability. A stabilizing combustion zone is created between the first fuel plane 2 and the second (oxidant) plane 4, that initiates the combustion above the main fuel sheet. A preferred location for the stabilizing natural auxiliary jet is the median plane between the oxygen cavities. In conditions where the natural gas velocity was 44 m/s, the oxygen velocity was 16 m/s, the distance h was 8 cm, and the angle $\alpha$ was 10°, lower $NO_x$ emissions (63 ppm) were found when the auxiliary natural gas injector was located exactly in between the oxygen cavities, than when the auxiliary natural gas injector was closer to one or the other oxygen cavities (74 ppm). However, in both cases, $NO_x$ emissions were low.

Modifying the angle a can be advantageously used to increase the heat transfer to the wall towards the first plane.

It has been found that increasing the angle a from 0° to 10° increased the temperature difference between the wall located near the first plane 2 and the opposed wall from 0° C. to 27° C. At $\alpha=20°$ the temperature difference was about 32° C.

A combustion system according to the invention can thus be used to increase the heat transfer toward the load and reduce the furnace crown temperature.

Figure 6:
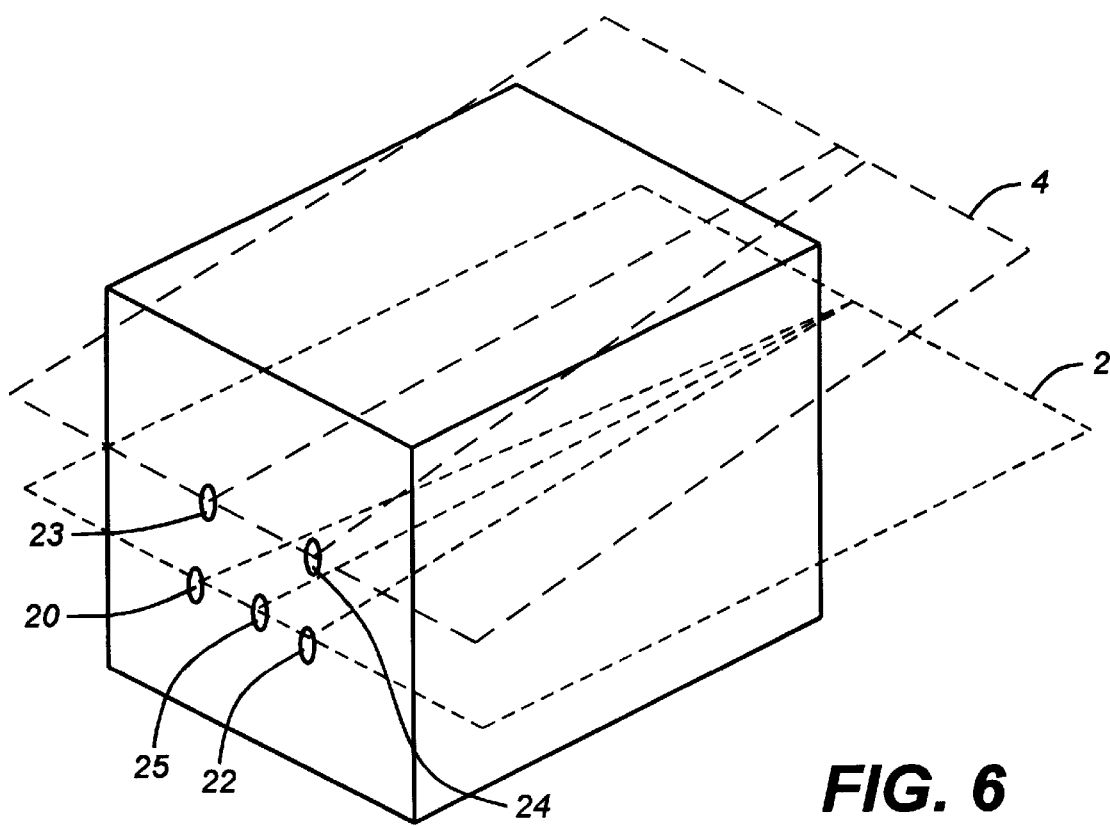
FIG. 6 illustrates a third burner assembly embodiment of the present invention, where the fuel "sheet" is formed by using two fuel cavities in a first fuel plane, the oxidant being supplied by two cavities in a second plane, and wherein the flame is being stabilized by an auxiliary oxidant cavity in the first fuel plane, between the fuel cavities.

According to another embodiment of the invention, an equivalent improvement of the flame stability can be obtained if an auxiliary oxygen injector 25 is installed in the first plane 2 of the fuel cavities 20, 22, as shown for example on FIG. 6. (The same relative locations of this oxygen injector and the gas cavities applies, as disclosed on FIG. 5.) In this configuration, there are two oxygen cavities 23, 24 in the second plane 4 and two fuel cavities 20, 22 and one oxygen injector 25 in the first fuel plane 2.

As it appears from the above description of the operation of the combustion system, the flame length can be varied by changing the angle a between the second plane 4 of the oxygen cavities and the first fuel plane 2 of the fuel cavities. The flame stability is enhanced and maintained over the range of flame length adjustment by an auxiliary injection of fuel near the oxygen cavities, or an auxiliary injection of oxygen near the fuel cavities. Changing the angle between the two flames can also be used to increase the neat transfer towards the load of the furnace, and thus improve the efficiency of the fuel burnt. In the case of glass furnaces, additional heat transfer in some areas of furnaces can be useful to enhance the convective circulations of the molten glass and/or increase the residence time of the molten glass in the furnace, which improves the glass quality.

Combustion systems of the present invention are intended to be used, for example, to replace air-fuel combustion systems in already existing furnaces, and/or to be used as the main source of energy in new furnaces.

In accordance with yet another aspect of the present invention, a burner is provided having oxidant exits which are slightly angled to the sides, and generally contoured, preferably rounded, at their tips (i.e. at the exit face 10). Quite surprisingly, it has been discovered that the angled exits allow the oxygen flow and, thus, the flame to be wider and prevent fuel from exiting unburned. Additionally, the rounded tips cause less turbulence, and, hence, afford a greater control over flame shape.

In fact, obtainment of a particular flame shape is most important and it is quite advantageous to be able to adjust flame shape to customer need.

These and other aspects of the present invention will be now be further described by reference to FIGS. 7–12.

The principal components of a preferred burner assembly depicted in FIG. 7 are: 1) a refractory block 5; 2) a mounting bracket assembly 72; 3) a fuel distributor 74, located at the bottom of the mounting bracket assembly, and 4) an oxidant distributor 76, located at the top of the mounting bracket assembly. Fuel is supplied through an inlet 78. Oxidant is supplied to the burner assembly through an inlet 80.

Figure 8A:
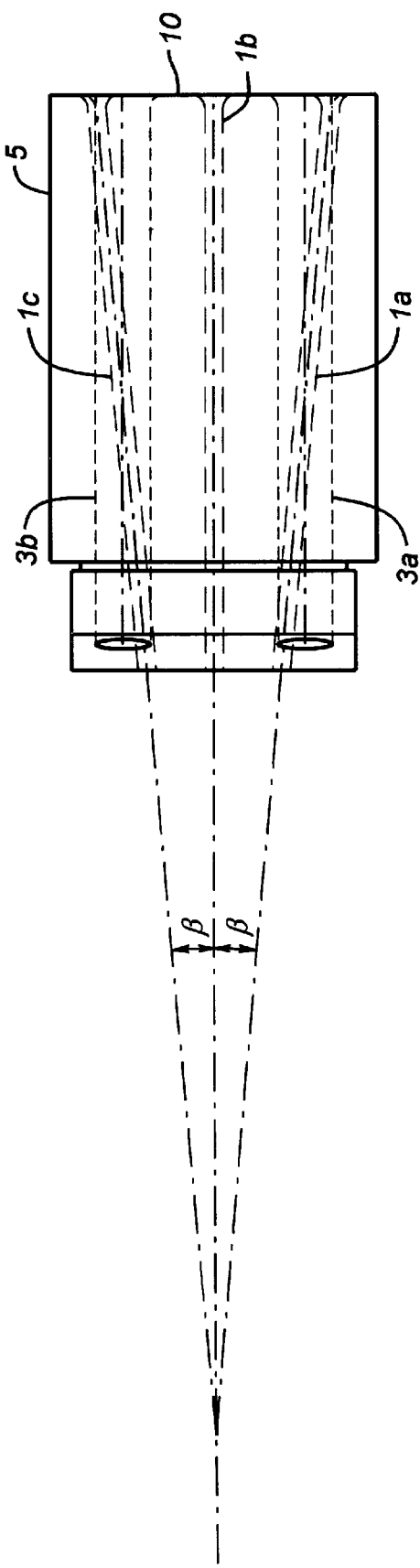
FIGS. 8(a), (b) and (c) illustrate top, back and side views, respectively, of a burner assembly of the present invention including cavities.

In FIGS. 8a (plan view), 8b (end elevation) and 8c (side elevation) the fuel and oxidant cavities are straignt holes through refractory block 5. The gas exit of each oxidant cavity and each fuel cavity have rounded edges at the gas exit face 10 as opposed to straight edges. The rounded edges reduce the velocity gradient between the gas flows ejected from the block and the surrounding atmosphere, which prevents particulates or volatile species contained in the atmosphere to build-up around the outlets of the cavities which in turn would alter the geometry of the cavities. This is particularly important in the case of the natural gas cavities, because the build-up process can be aggravated by the thermal cracking of the natural gas and the formation of coke deposits at the natural gas exits from the refractory blocks, which can alter flow direction in the furnace.

The bottom cavities used for the fuel make a diverging angle β in order to distribute the fuel gas flow in a sheet pattern. An angle β of 5 degrees is represented in FIG. 8(a). From results of numerical simulations, it was found that the flame width could be increased by Increasing the angle of the natural gas cavities. For instance, β=7.5 degrees produce a wider flame compared to β=5 degrees, without significantly reducing the flame length.

Figure 8C:
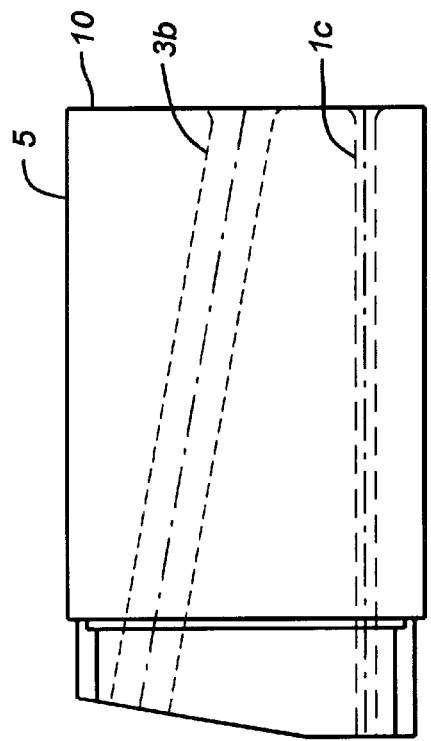
Figure 8B:
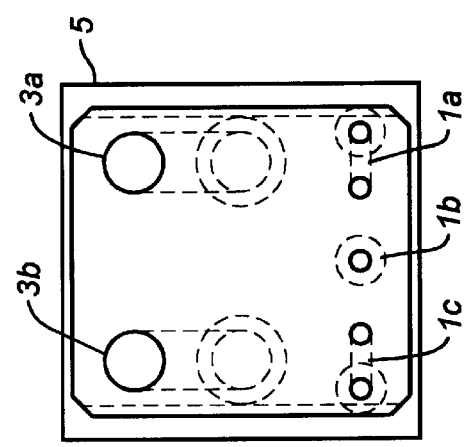
Figure 9A:
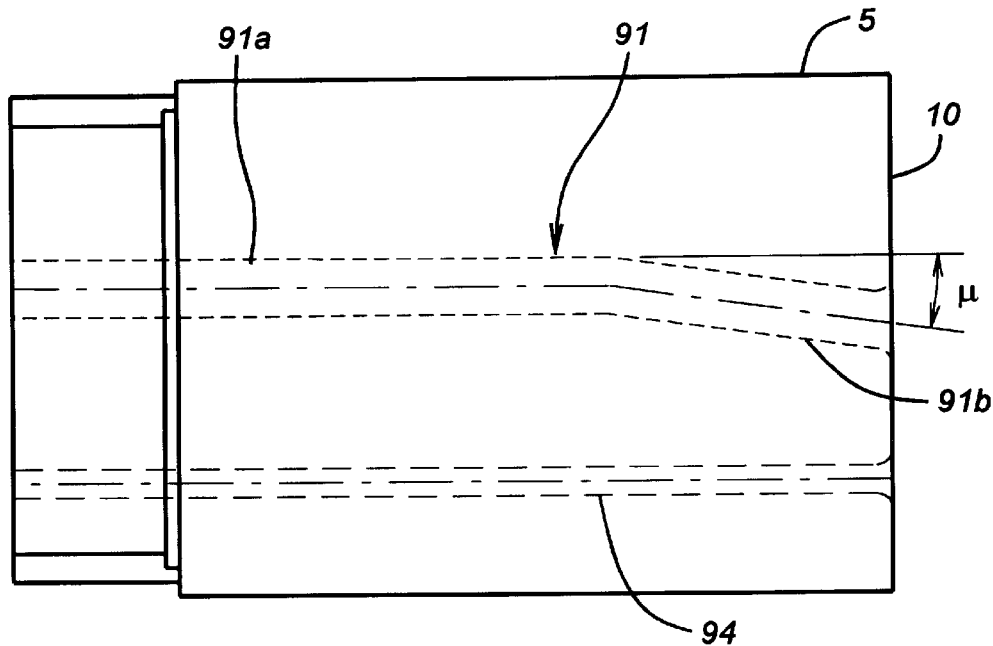
FIGS. 9(a) and (b) illustrate a refractory block of the present invention, showing various cavities.
Figure 9B:
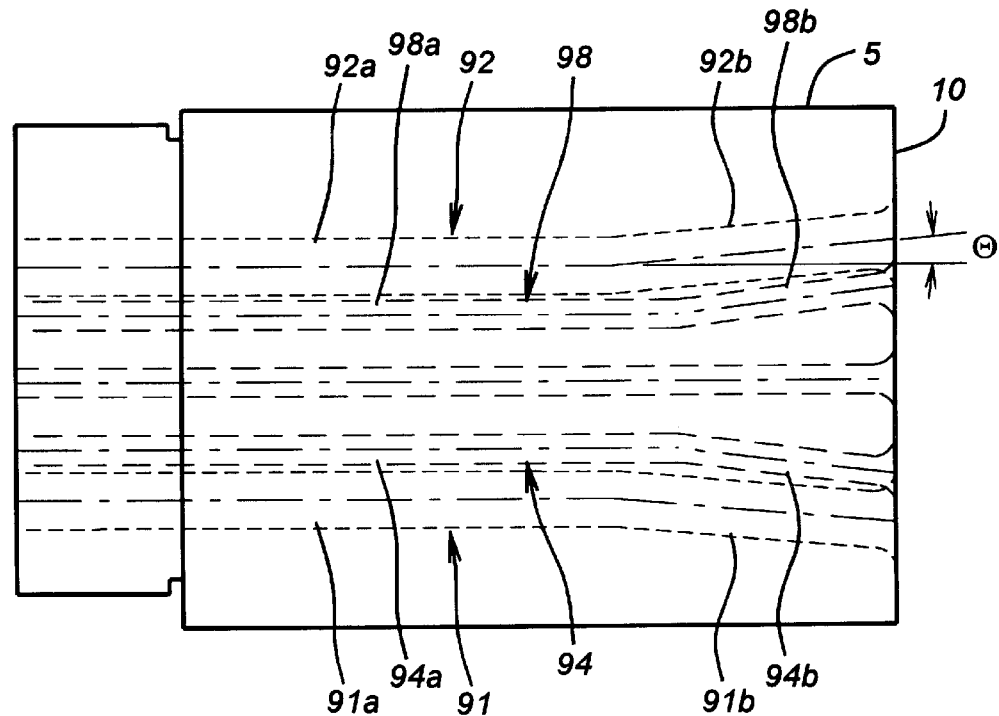

The refractory block 5 illustrated in FIGS. 9a (side elevation) and 9b (plan view) has five cavities: three cavities at the bottom for the injection of fuel in the furnace, and two cavities at the top for the oxidant injection. The refractory block 5 depicted in FIGS. 9a and 9b is preferably a single piece of refractory material having multiple cavities or through holes therethrough, such as cavities 91 and 92 for oxidant, and cavities 94, 96, and 98 for fuel. In the embodiment illustrated in FIGS. 9a and 9b, note that oxidant cavities 91 and 92 are initially parallel to each other and with the fuel cavities (see portions 91a and 92a), but then angle away from each other at an angle of 2Θ, and toward the fuel cavities at an angle μ. Also note that fuel cavities 94 and 98 (the two on either side of the block 5) angle away from the central fuel cavity 96 at an angle, preferably also Θ. This design allows the ability to position the exits of the fuel cavities closer to one another than in the embodiment illustrated in FIG. 8. Closer fuel exits might be useful when the fuel is fuel oil.

Suitable materials for the refractory block are fused zirconia ($ZrO_2$), fused cast AZS (alumina-zirconia-silica), rebonded AZS, or fused cast alumina ($Al_2O_3$) The choice of a particular material is dictated among other parameters by the type of glass mrelted in the glass tank.

Figure 10B:
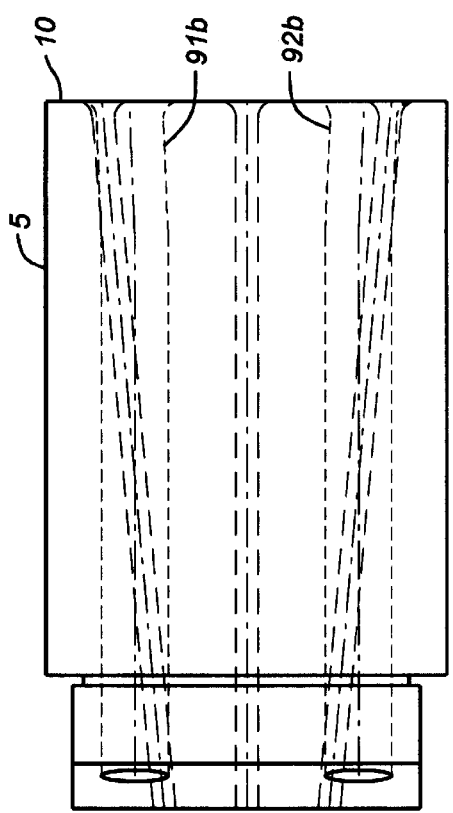
FIGS. 10(a), (b), (c) and (d) illustrate a burner block assembly, oxygen distributor and fuel distributor of the present invention.
Figure 10D:
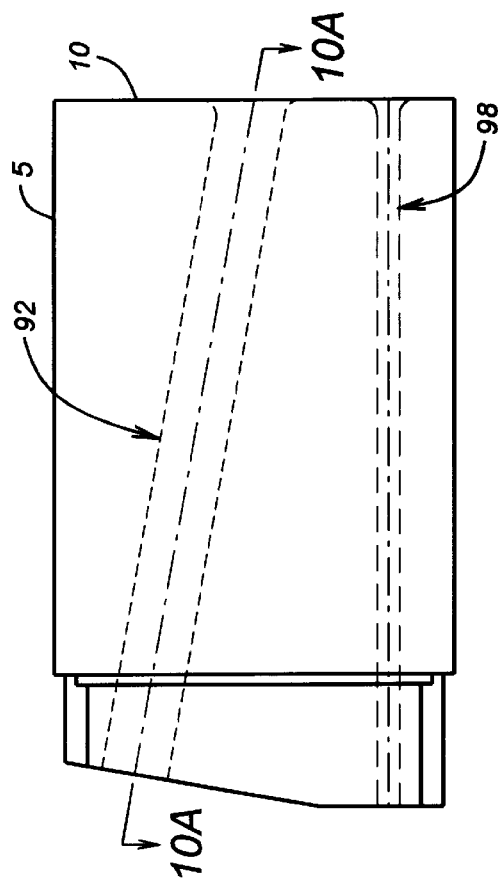
Figure 10A:
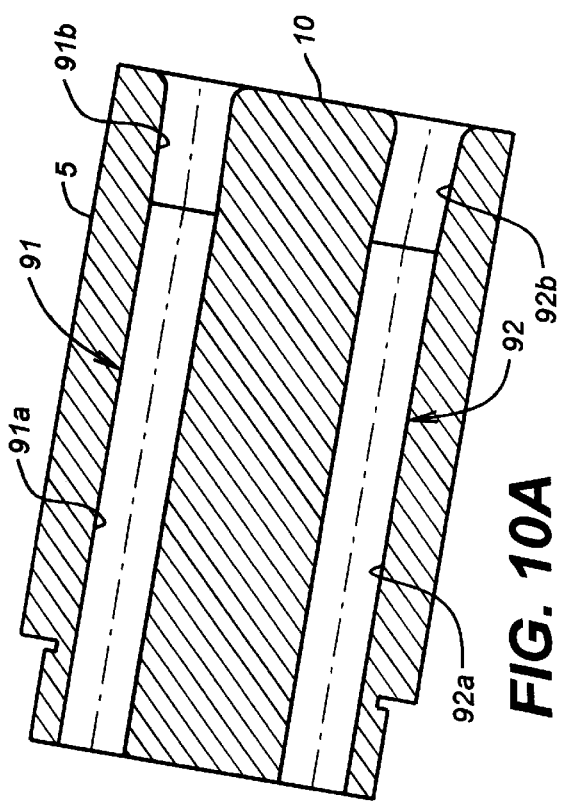
Figure 10C:
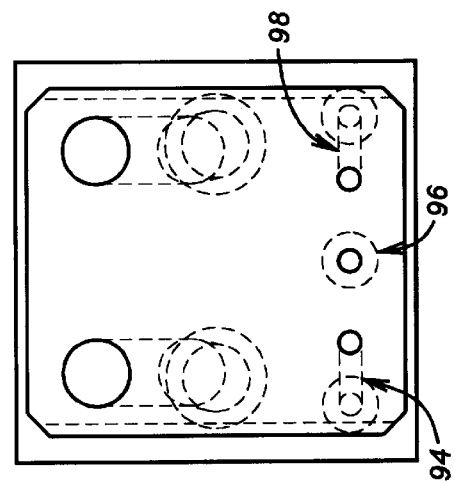

Straight cavities as illustrated in FIG. 8 are easy to clean in case some material happens to block the gas outlets. However, angling out the last few centimeters of the cavities is enough to impart a diverging angle to the fuel gas streams. Such a cavity design is illustrated in FIGS. 10a (plan view illustrating oxidant cavities only), 10b (plan view illustrating fuel and oxidant cavities), 10c (back end elevation) and 10d (side elevation), in the case of the oxidant cavities. Each of the oxidant cavities 91 and 92 comprise two straight flow paths 91a and 92a, initially parallel, that make a small outward angle near the exit (flow paths). The purpose of the small angle is to direct the flow of oxidant outwards, in a similar fashion as the jets of fuel gas. in laboratory and field tests, angling out the oxidant (in the tests oxygen was used) cavities proved to give more stability to the flame and is beneficial to the burner operation by widening flame width without significantly decreasing flame length. A preferred configuration is when the angle between the two oxidant cavities at their exits is equal to the angle between the two side fuel gas cavities.

Figure 11D:
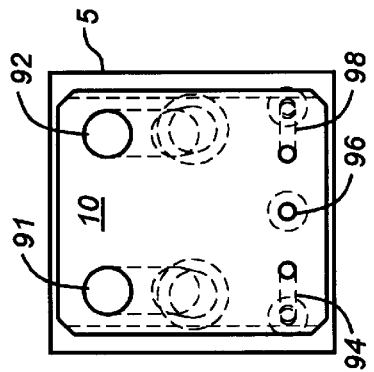
FIGS. 11(a), (b), (c), (d), and (e) illustrate another burner block assembly, oxygen distributor and fuel distributor of the present invention.
Figure 11E:
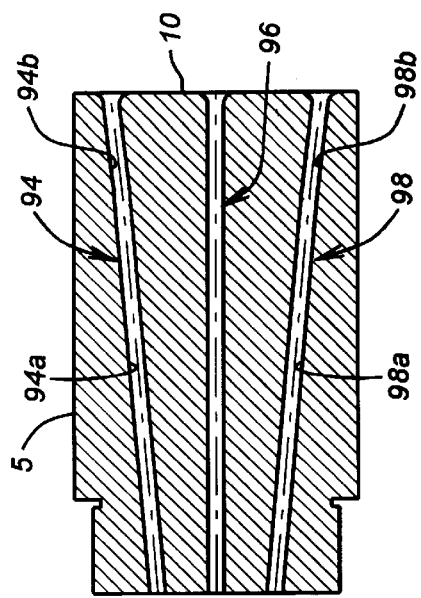
Figure 11A:
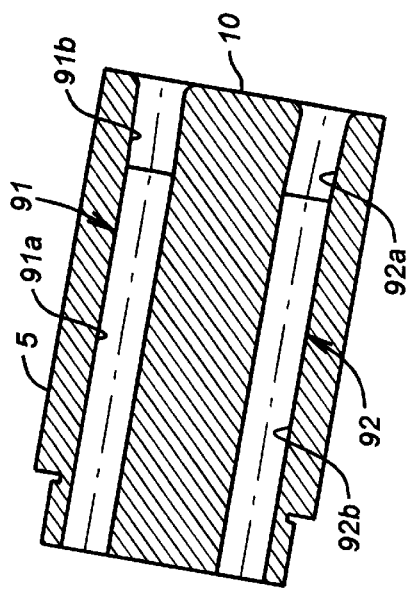
Figure 11B:
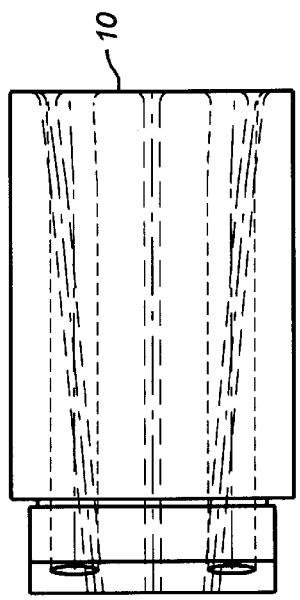
Figure 11C:
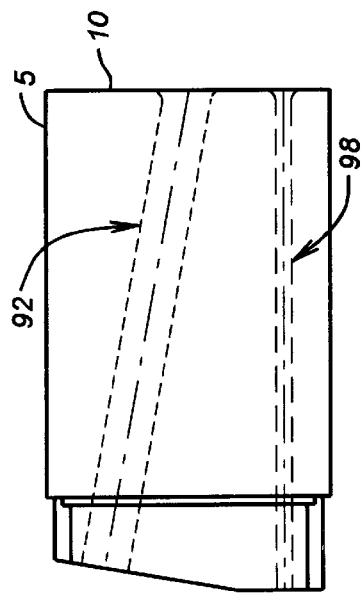

The embodiment illustrated in FIGS. 11a–e is similar to the embodiment illustrated in FIG. 10, except that FIG. 11e illustrates that the two side fuel injectors make a small angle outward near their exit; thus both of the oxidant cavities 91b and 92b veer outward near exit face 10, as well as the two side fuel injectors 94b and 98b.

From FIGS. 8, 10, and 11 it can be seen that the oxygen cavities are preferably angled downward toward the natural gas cavities. The angle shown on the drawings is 10 degrees. Under certain conditions, a smaller angle (such as 7.5 degrees) can be used. Again angling out the last few inches of the cavities is enough to impart a converging angle between the oxygen jets and the natural jets.

The burner assembly illustrated in FIG. 12 includes a mounting bracket made of two parts that are positioned on each of the upper and lower portions of refractory block 5, fastened together by bolts 32 screwed in plate P. The mounting bracket assembly slides in vertical grooves $G_1$ and $G_2$ in the refractory block, and is thus well anchored to the block once the bolts 60 and 61 are in place.

An oxidant distributor 30 of FIG. 12 is mounted directly on the mounting bracket assembly with bolts 32 and plate 34. Tightness between the distributor and the block is insured by a gasket 36. The distributor comprises a plate 38 on which oxidant injectors 40 and 41 are welded. When mounted on the burner, the oxidant injectors penetrate into cavities in burner block 5, and stop about 10 cm (4 inches) away from exit face 10 of the block, before any change in direction of the flow that can be imparted by the geometry of the oxidant cavities.

Figure 12A:
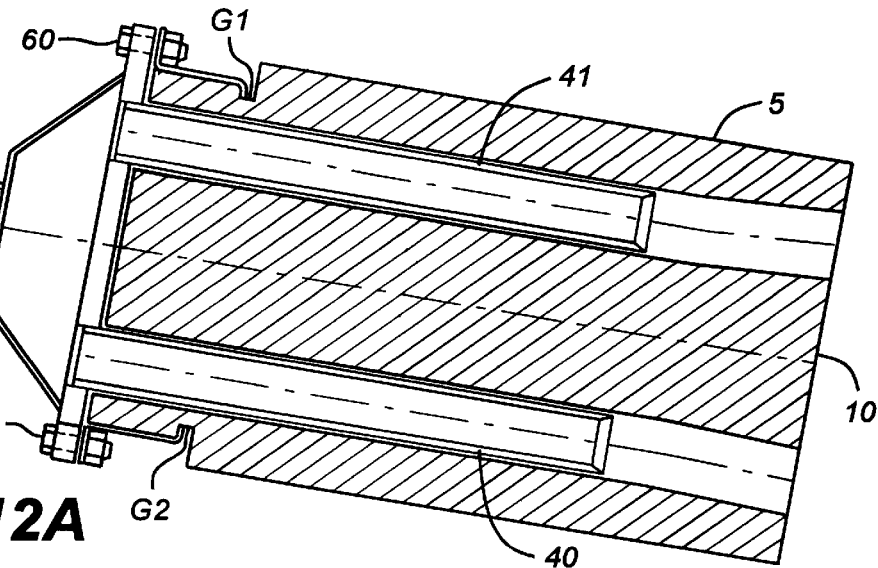
FIGS. 12(a), (b), (c) and (d) illustrate a burner assembly of the invention in top, side, bottom, and detail views, showing in particular, the tube sealing detail.
Figure 12B:
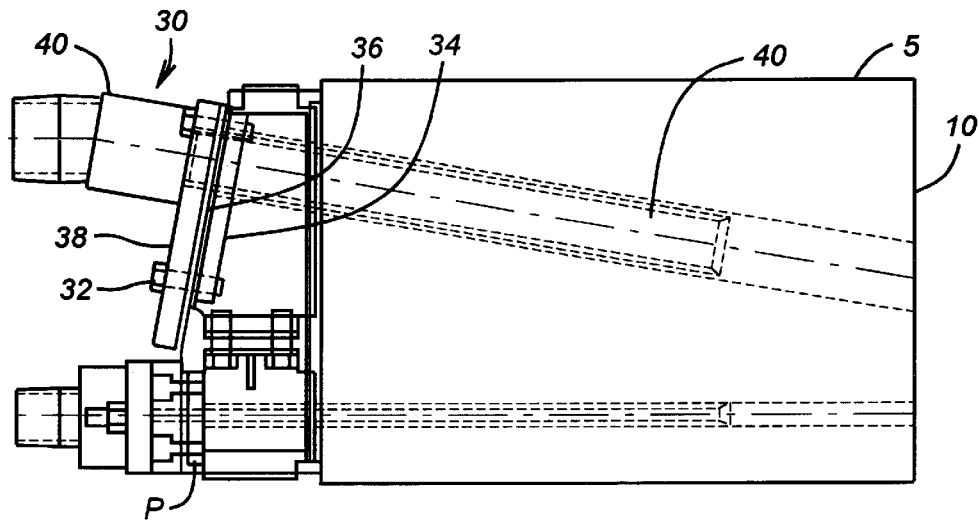
Figure 12C:
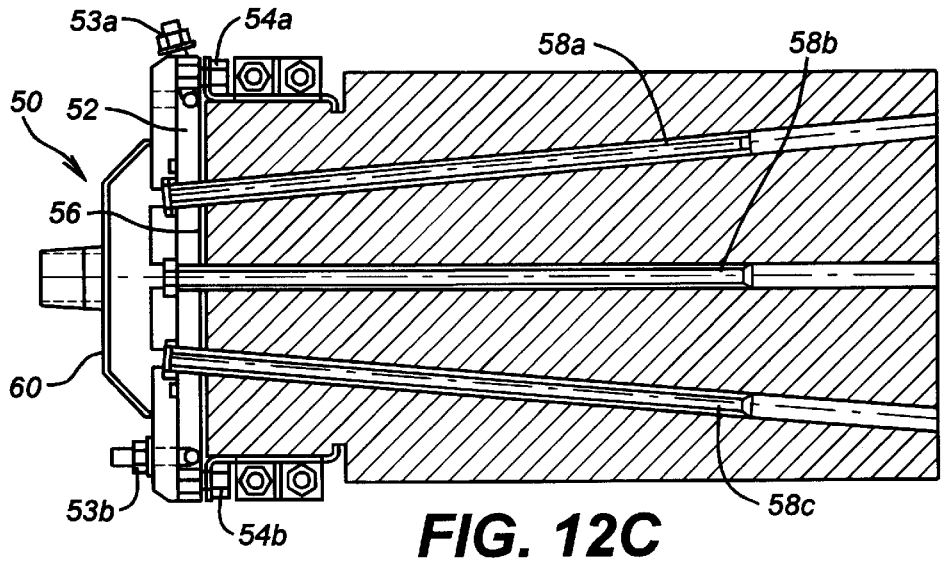
Figure 12D:
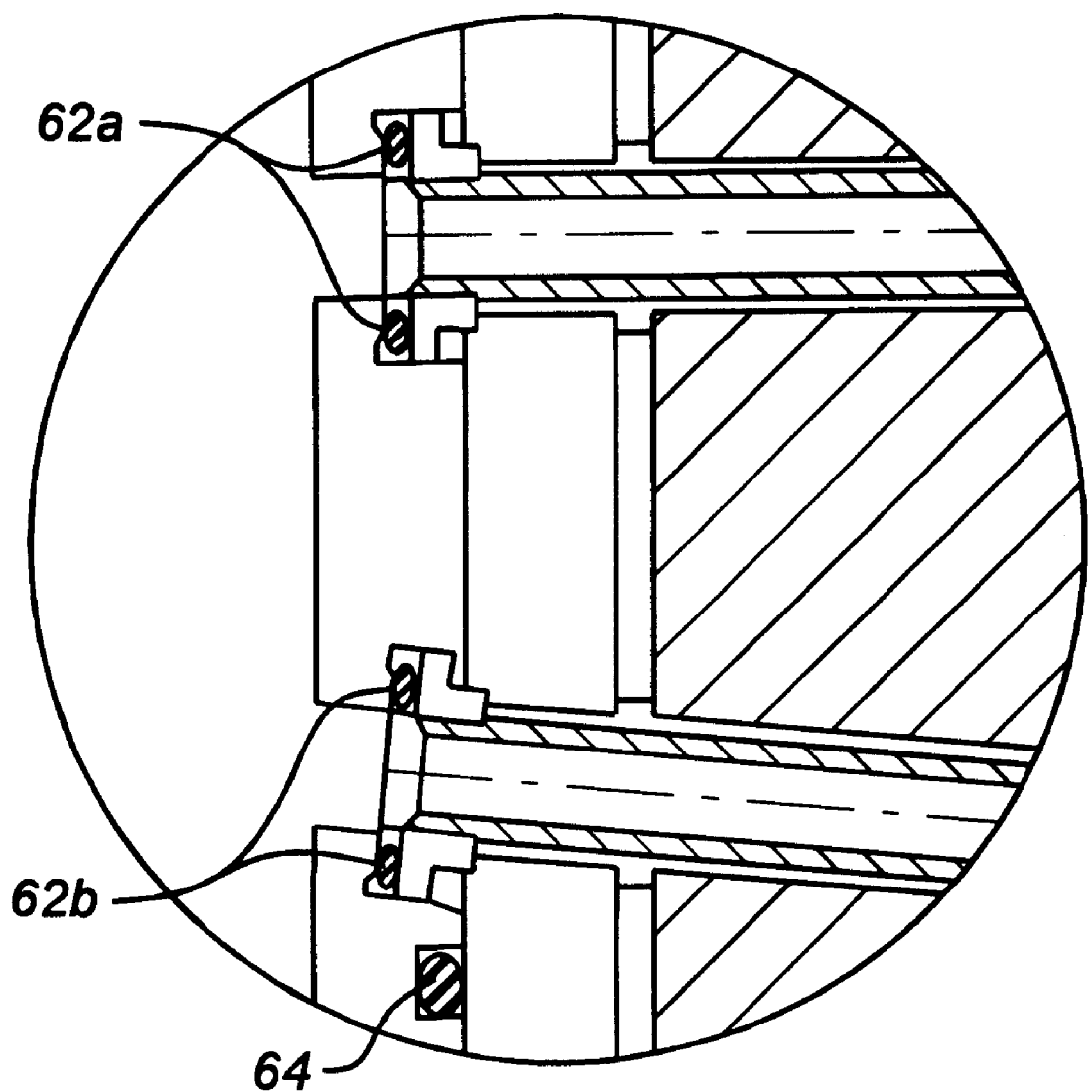

A fuel gas distributor 50i mounted on a plate 52 with quick connect clamps 53a and 53b. Plate 52 is attached to the mounting bracket by bolts 54a and 54b. Tightness between plate 52 and refractory block 5 is insured by a gasket 56. Three gas injectors 58a, 58b, and 58c penetrate into refractory block 5, and stop about 10 cm (4 inches) away from exit face 10 of block 5 before any chance in direction of the flow that can be imparted by the geometry of the fuel gas cavities, The inlet heads of the fuel gas injectors are imprisoned between the injector 60 and plate 52. Fuel gas injector tightness is insured by O-rings 62 and 64 positioned on the inlet head of the fuel gas injectors. The tube sealing detail in FIG. 12(d) is noted, in particular.

Figure 13A:
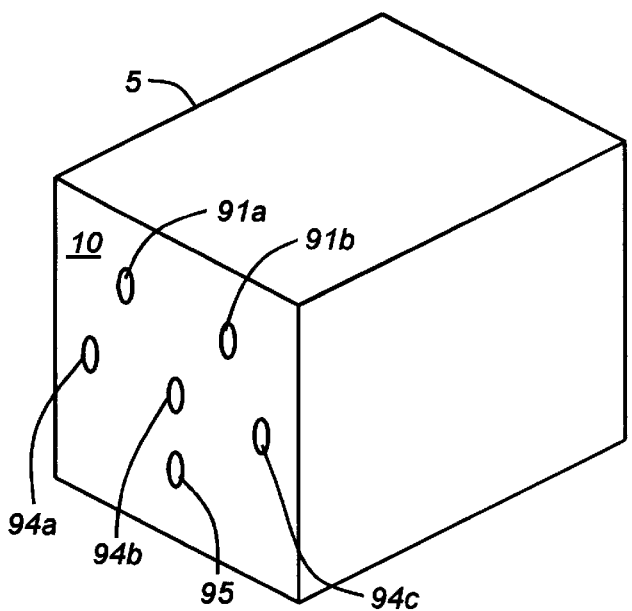
FIG. 13a is a perspective view of a refractory block useful in the invention, illustrating two oxidant cavities, three fuel gas cavities, and one fuel oil cavity.
Figure 13B:
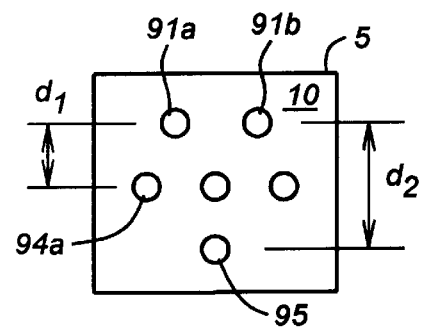
FIG. 13b is a side elevation view of the refractory block of FIG. 13b.
Figure 13C:
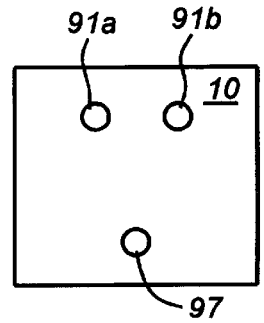

FIG. 13a is a perspective view of a refractory block 5 useful in the invention, illustrating the exits of two oxidant cavities 91a and 91b, the exits of three fuel gas cavities 94a, 94b, and 94c, and the exit of one liquid fuel cavity 95, FIG. 13b is a gas exit end elevation view of the refractory block of FIG. 13b, illustrating distances $d_1$ and $d_2$, wherein $d_2$ is the distance between a plane containing the axial center of the two oxidant cavities 91 (second plane) and the liquid fuel cavity 95, and $d_1$ is the distance between the second plane and a plane containing the three fuel gas cavities 94. (Note that $d_1$ is the same distance as h in FIG. 2) FIG. 13c is a gas exit end elevation view of an alternate design for the refractory block of FIG. 13a, illustrating an embodiment wherein there are in fact no gaseous fuel exits, and only one liquid fuel exit 97 is present (the two oxidant gas exits are the same as in FIG. 13a).

Figure 22:
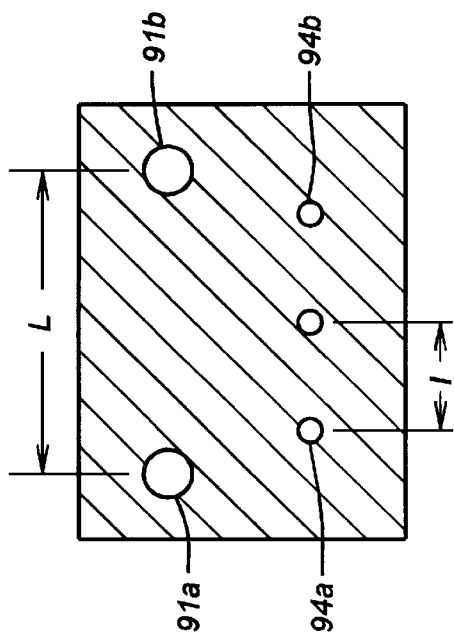
FIGS. 21, 22, 23, 24, 25, 26, 27, 28, 29, 30, 31, 32, and 33 are front elevation views of thirteen refractory block embodiments within the invention.

A relationship has been found to exist between the power of the inventive burner and the distances $d_1$=h, $d_2$, d, D, L, and 21 as depicted in FIGS. 2, 13b, and 22. If the distance between oxygen and natural gas exits from the burner is defined by $d_1$, then $$d_1 = A(P/1000)^{1/2}$$

wherein P is the burner capacity in kilowatts (kW), and about 500 mm<A<about 150 mm. The preferred value for A is about 110 mm. If $d_2$ is defined as the distance from the plane containing the fuel gas exits to the parallel plane containing the liquid fuel exit, then $$d_2 = d_{1\rho FO/\rho NG}[(I_{FO}+I_{AIR})/I_{NG}](10^{-3})$$

wherein:

$I_{FO}$=liquid fuel momentum in the cavity or injector, $I_{AIR}$=atomizing air momentum in the injector or cavity, $I_{NG}$=gaseous fuel momentum, $\rho_{FO}$=liquid fuel specific gravity, and $\rho_{NG}$=gaseous fuel specific gravity.

For the preferred value of A and for the following momentum value:

$I_{FO}$=0.06N, $I_{AIR}$=1.79N, $I_{NG}$=1.56N, $\rho_{FO}$=0.9kg/dm$^3$, and $\rho_{NG}$=0.74kg/m$^3$, the dimensional values listed in Table 1 are available.

TABLE 1

| | Burner Power | | | | | | | | |
|---|---|---|---|---|---|---|---|---|---|
| Power (kW) | 500 | 1000 | 1500 | 2000 | 3000 | 4000 | 5000 | 6000 | 7000 |
| $d_1$ (mm) | 78 | 110 | 135 | 156 | 191 | 220 | 246 | 270 | 291 |
| $d_2$ (mm) | 113 | 160 | 196 | 227 | 278 | 320 | 358 | 392 | 423 |
| d (mm) | 10.6 | 15 | 18.4 | 21.2 | 26 | 30 | 33.5 | 36.7 | 39.7 |
| D (mm) | 29.7 | 42 | 51.4 | 59.4 | 72.7 | 84 | 93.9 | 102.9 | 111.1 |
| L (mm) | 113.1 | 160 | 196 | 226.3 | 277.1 | 320 | 357.8 | 391.9 | 423.3 |
| 2l (mm) | 99 | 140 | 171.5 | 198 | 242.5 | 280 | 313 | 342.9 | 370.4 |

Figure 14:
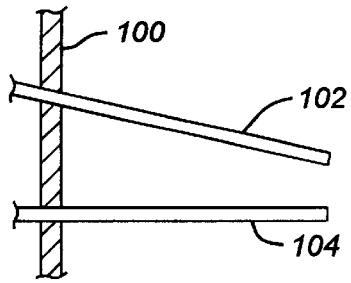
FIG. 14 is a side elevation view of a burner assembly without a refractory block, having only oxidant and fuel in ectors.

FIG. 14 is a side elevation view of a burner assembly without a refractory block, having only oxidant injectors 102 and fuel injectors 104 inserted through and secured in a wall 100 of a furnace or glass melt tank, in accordance with another burner assembly embodiment of the present invention. The oxidant injectors are illustrated as being straight, with no change in angle, but of course the injectors may initially be parallel with the fuel injectors, and then change direction, so that the fuel and oxidant mix in the combustion chamber. This embodiment may also be used when the fuel is a liquid fuel. This arrangement, as well as the embodiment illustrated in FIG. 17, may be useful in that the fuel and oxidant may be preheated by combusted fuel in the combustion chamber, adding to the efficiency of fuel combustion.

Figure 15:
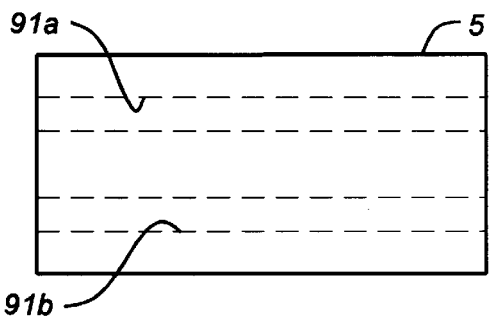
FIG. 15 is a plan view of a refractory block, illustrating cavities.
Figure 16:
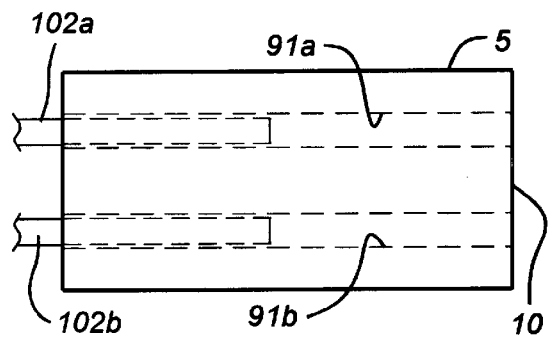
FIG. 16 is a plan view of the refractory block of FIG. 15, illustrating an embodiment having short injectors inside the cavities.
Figure 17:
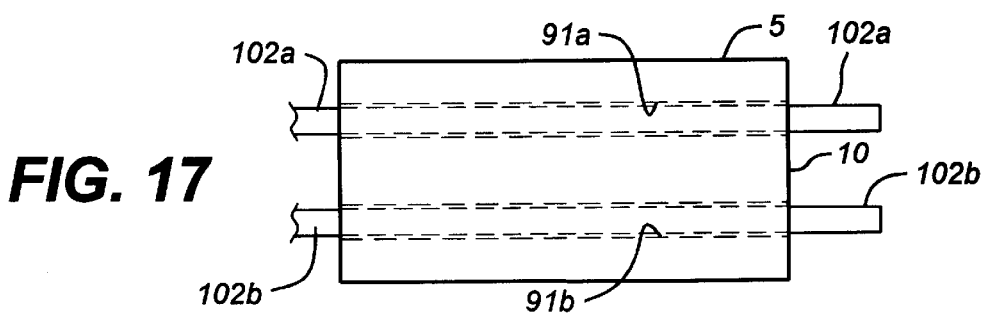
FIG. 17 is a plan view of the refractory block of FIG. 15, illustrating an embodiment having long injectors protruding outside of the cavities.

FIG. 15 is a plan view of a refractory block, illustrating cavities (oxidant or fuel) 91a and 91b; FIG. 16 is a plan view of the refractory block of FIG. 15, illustrating an embodiment having short injectors 102a and 102b inside the cavities; and FIG. 17 is a plan view of the refractory block of FIG. 15, illustrating an embodiment having long injectors 102a and 102b protruding outside of the cavities.

II. Specifics for Liquid Fuel Atomization

Figure 18:
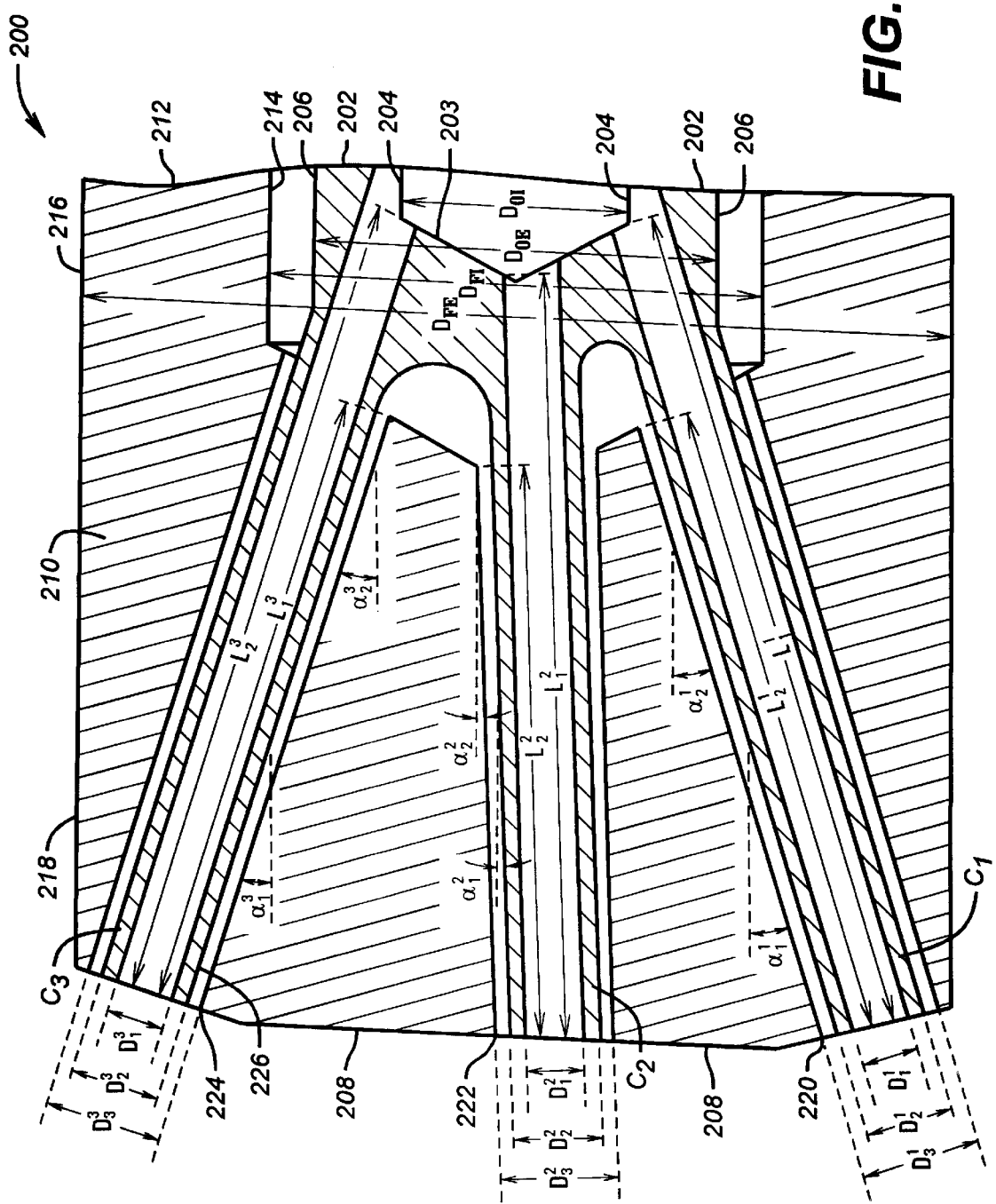
FIG. 18 is a side elevation view of a liquid fuel atomizer useful in the invention.

FIG. 18 is a sectional view of a liquid fuel atomizer 200 useful in the invention.

As stated previously in the Background section, the present aspect of the invention falls within the scope of the third mode of liquid fuel atomization; it describes a complete device that makes possible control of the atomization of a liquid fuel using a gaseous fluid and the application of this device to a burner, such as the inventive burner assemblies described herein.

In the present invention, even though the geometry for fluid introduction seems similar, the fluid introduction into the combustion zone is a two-phase mixture of atomizing gas and droplets of liquid fuel. Further, the specific characteristics of the invention reside in the fact that atomization takes place outside of the nozzle (external atomization) and yet permits forming distinct spray jets having high relative angles (5° to 30°)

The fundamental constraint on a liquid fuel atomizer operating in high temperature combustion zones (varying from 1400° C. to 1700° C.) is its durability. Moreover, the flame produced at the outlet of this injector is an oxy flame residing at an even higher temperature (>2200° C.). These high temperatures must not under any circumstance lead to any damage of the components comprising this device. This device must be able to function continuously under these conditions and with an inspection frequency on the order of months.

The inventive liquid fuel atomizer is capable of ensuring the production of a single broad flame, a single long flame, or several short flames simultaneously.

The atomization principle adopted in the atomizer of the present invention is external atomization. This choice was essentially imposed by the constraints of thermal resistance and maintenance of the injector when used in a third generation burner (self-cooled burner with separate injection). In effect, the temperature levels potentially reached by the fuel injectors in burners of this type are very much higher than those previously encountered with first and second generation burners.

These temperature levels therefore do not allow direct contact between the fuel spray and high temperature metal parts. This contact would inevitably lead to coke formation at the tip of the injector and, in short order, plugging of the tip.

External atomization is the only mode of atomization which is able to obviate this difficulty and thereby ensure an injector servicing frequency on the order of a month. In a effect, this atomization is characterized by the formation of the spray outside of the injector, thus precluding all contact between the spray and metal parts.

Moreover, as we will see in the description of the device, the liquid fuel is constantly "sheathed" by the atomizing fluid, which, being heated preferentially, draws off the heat flux transmitted to the injector. By playing the role of a heat transfer fluid for cooling, the atomizing fluid thus protects the liquid fuel from any excessive heating that could produce the beginnings of coke formation.

A. Description of the Inventive Liquid Atomization Device (FIG. 18)

The liquid fuel atomizer of the present invention comprises:

a liquid fuel injector, and an outer nozzle completely surrounding the injector.

To facilitate cleaning of the atomization device, this outer nozzle is composed of two symmetrical cowls which, when they are positioned face to face, form channels for flow of atomization fluid, as further explained in part IIB.

Reference will now be made to FIGS. 18–19. In FIG. 18, the liquid fuel atomizer 200 is composed of a first hollow cylinder 202 having an internal surface 204 of inside diameter $D_{OI}$ and an outside surface 206 having outside diameter $D_{OE}$. Hollow cylinder 202 has a fuel exit end 203 having a single fuel exit fluidly connected to a plurality of hollow elementary conduits $C_1$, $C_2$, and $C_3$. Liquid fuel is delivered into first hollow cylinder 202 having diameter $D_{OI}$ and then to the interior of all the hollow elementary conduits to emerge from an atomized fuel exit end 208 of the liquid fuel atomizer 200 (combustion chamber side). The number of hollow elementary conduits C can range from 2 to 5 (typically 2 or 3). The axes of all the hollow elementary conduits C are in the same plane ("spray plane"); this plane contains the axis of the first hollow cylinder 202.

In FIG. 18 and the accompanying discussion, the symbols which carry a numeral in superior position will refer to the number of elementary atomizer.

Each of the hollow elementary conduits C will have an inside diameter $D^i_1$ (into which the liquid fuel will flow) and an outside "diameter" $D^i_2$. The external shape of the hollow elementary conduits C is not necessarily cylindrical: it can be parallelepipedal with square section. In such a case, $D^i_2$ is the side of the square, the side parallel to the "spray plane."

Each of these hollow elementary conduits C has an inclination angle $\alpha^i_1$ with respect to the axis of the cylinder ($D_{OI}$; $D_{OE}$); this angle is in the "spray plane."

The length of each of these hollow elementary conduits C (distance between the first hollow cylinder 202 and the end of the hollow elementary conduit) is $L^i_1$.

Figure 19A:
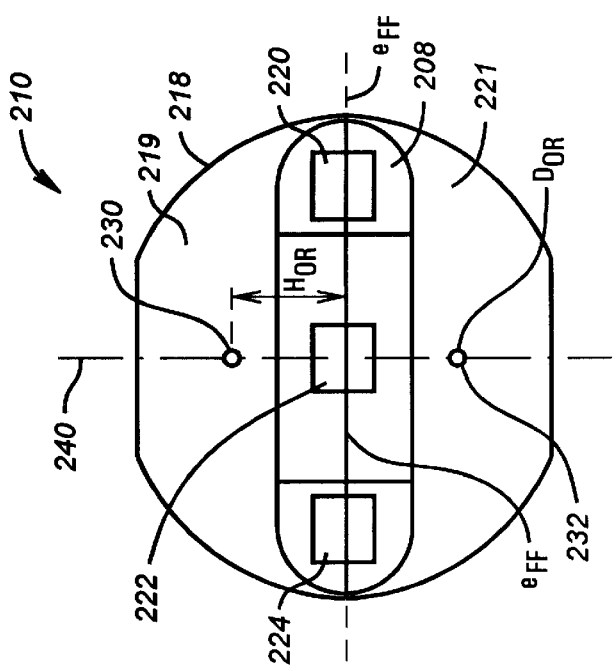
FIGS. 19a and 19b are sectional and front end elevation views, respectively, of the liquid fuel atomizer of FIG. 18.
Figure 19B:
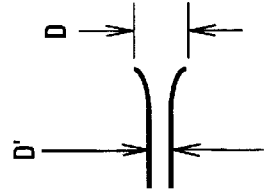

B. Description of the Outer Nozzle (FIGS. 19a and 19b)

The outer nozzle 210 is formed of a second hollow cylinder 212 (having an inside surface 214 of diameter $D_{FI}$ and an external surface 216 of outside diameter $D_{FE}$) which is extended by a profiled part 218 comprised of two symmetrical cowls 219 and 221. The interior of profiled part 218 of nozzle 210 is pierced by channels 220, 222, 224 which merge with the second hollow cylinder 212. The number of channels 220, 222, 224 is equal to the number of hollow elementary conduits C present in outer nozzle 210. All the axes of these channels 220, 222, 224 are located in the "spray plane", denoted by solid line eff which also contains the axis of second hollow cylinder 212. Solid line $e_{ff}$ denotes the separation between symmetrical cowls 219 and 221.

The channels 220, 222, 224 have a length $L^i_2$ and a diameter $D^i_3$. The shape of the channels is the same as that of the elementary conduits of the fuel injector: it can be cylindrical or parallelepipedal with square section (in the former case, $D^i_3$ is the diameter of the cylinder; in the latter case $D^i_3$ is the length of the side of the square, the side parallel to the "spray plane").

Each of channels 220, 222, 224 has an inclination angle $\alpha^i_2$ with respect to the axis of the second hollow cylinder 212; this angle is in the "spray plane."

The axis of first hollow cylinder 202 coincides with that of second hollow cylinder 212.

The atomizing fluid is delivered through second hollow cylinder 212, between surfaces 206 and 214, and then to the interior of the outer nozzle 210 and through channels 220, 222, and 224, and to exit end 208.

C. Details of an "Elementary Atomizer" (FIG. 18)

An elementary atomizer is comprised of a hollow elementary conduit $C_3$ inside which the liquid fuel flows. The outside surface 226 of a hollow elementary conduit $C_3$ can be cylindrical or parallelepipedal with square section; the internal geometry of the hollow elementary conduit $C_3$ is cylindrical.

a machined channel 224 in which hollow elementary conduit $C_3$ is arranged. The geometry of this channel 224 is the same as the external geometry of hollow elementary conduit $C_3$. The atomizing fluid circulates in channel 224, around hollow elementary conduit $C_3$.

To provide external atomization of the liquid fuel by the atomizing fluid, all the elementary atomizers composing the atomization device 200 of the invention conform to precise technical criteria.

For each elementary atomizer i, where i can be equal to 1, 2, 3, 4, or 5 according to the number of elementary atomizers which the atomization device of the invention has, the following apply:

1. To avoid any plugging of the hollow elementary conduit C where the liquid fuel circulates:

$D^i_1 \geq 0.5$ mm and typically $D^i_1 = 2$ mm.

2. The thickness of the hollow elementary conduit C must be as small as possible in order to permit immediate shearing of the jet of liquid fuel as it exits from the hollow elementary conduit C by the atomizing fluid which flows along its periphery: the smaller the thickness of material separating the fuel from the atomizing fluid is, the more rapidly the two fluids will be brought in contact and thus the more effective the shearing between the two jets will be. Furthermore, a reduction in the thickness of the conduit also favors the formation of a spray having a low solid angle.

3. Lastly, a decrease in this thickness also serves to decrease the amount of material subjected to the thermal radiation from the combustion chamber: the smaller the thickness of the conduit is, the more limited the amount of heat captured by the conduit will be. The temperature of the conduit will be lowered as a consequence.

On the other hand, this thickness must be sufficient to provide mechanical resistance to the shocks that occur during manipulation of the atomization device.

$D^i_2 - D^i_1 \leq 6$ mm, and typically and preferably $D^i_2 - D^i_2 = 1$ mm.

The space between the outside surface 226 of the hollow elementary conduit $C_3$ and the inside of the channel 224 ("the flame") must be proportioned in such a way that the velocity of the atomizing fluid ($V_{atomizing\ fluid}$) follows the relationship:

Mach $0.3 \leq V_{atomizing\ fluid} \leq$ Mach 1.2.

Accordingly, depending on the delivery rates of the fuel to be atomized, the following applies:

$0.2$ mm $\leq (D^i_3 - D^i_2) \leq 6$ mm, and typically $(D^i_3 - D^i_2) = 1$ mm.

The purpose of each of the elementary atomizers is to eject a spray of droplets in a precise direction. This direction is the direction of the axis of channel 224 and hollow elementary conduit $C_3$ for liquid fuel.

To ensure this precise orientation of the trajectories of the droplets composing the spray, it is necessary to have perfect coaxiality between the axis of channel 224 and that of hollow elementary conduit $C_3$. Thus the criterion is:

$$\alpha^i_1 = \alpha^i_2.$$

Furthermore, the length of the hollow elementary conduit and the length of its respective channel must be sufficient to secure establishment of the flows of the two fluids in their respective conduits. If one wishes that the two fluids enter the combustion chamber with the same orientation of the axial components of their respective velocity vectors, it is preferred that:

$$L^i_1 \geq 5D^i_1 \text{ and typically } L^i_1 = 0D^i_1$$

$$L^i_2 \geq 5(D^i_3 - D^i_2) \text{ and typically } L^i_2 = 15(D^i_2 - D^i_2)$$

D. Distribution of Fluids Among the Different Elementary Atomizers

To ensure a proper distribution of the liquid fuel among the different hollow elementary conduits C composing the device, the criterion to be satisfied is:

$$D_{OI}^2 \geq 1.3 \Sigma_i {D^i_1}^2 \text{ and typically } D_{OI} = 4 \text{ mm}.$$

Furthermore, the lengths of the different hollow elementary conduits C must be as close to one another as possible:

Letting i and j be two elementary atomizers, $L^i_1 = L^j_1$.

Depending on whether one does or does not wish to distribute different liquid fuel delivery rates to each of the hollow elementary conduits C, one may or may not choose $D^i_1$ values specific to each of the hollow elementary conduits C. The larger $D^i_1$ is, the more fuel will be carried by hollow elementary atomizer i.

To ensure a proper distribution of atomizing fluid to the various elementary atomizer channels 224 comprising the device, the criterion to be satisfied is:

$$D_{FI}^2 - D_{OE}^2 \geq 1.3 \Sigma_i (D^i_3{}^2 - D^i_2{}^2).$$

Furthermore, the lengths of the different conduits must be as close to one another as possible:
Letting i and j be two elementary atomizers, $L^i_2 = L^j_2$.

E. Relative Angles Between Different Elementary Atomizers: Example of a Device Having Three Elementary Atomizers (FIG. 18)

The relative angle between the different elementary atomizers is a function of the number of elementary atomizers composing the atomization device and the flame morphology one wishes to obtain. Thus:

$$0° \leq \alpha^i_1 \leq 60° \text{ and } 0° \leq \alpha^i_2 \leq 60°.$$

In general, the greater the number of elementary atomizers and the larger the relative angles between these elementary atomizers, the wider and shorter the flame will be. Conversely, an atomization device having two elementary atomizers with a low relative angle (on the order of 10°, that is $\alpha^1_1 = \alpha^1_2 = 5°$ and $\alpha^2_1 = \alpha^2_2 = 5°$) will produce a long and straight flame.

By way of example, the following flames were obtained in industrial tests in a glass furnace and in a pilot furnace with two atomization devices each having three elementary atomizers:
Fuel oil delivery rate=100 kg/h; atomizing air delivery rate=20 kg/h.

Device A (FIG. 18):
$\alpha^1_1 = \alpha^1_2 = 16°$; $\alpha^2_1 = \alpha^2_2 = 0°$; $\alpha^3_1 = \alpha^3_2 = 16°$.
$D^1_1 = D^2_1 = D^3_1 = 2.0$ mm.
Length of visible flame=3.5 m.
Width of visible flame=1.5 m.

Device B (FIG. 18):
$\alpha^1_1 = \alpha^1_2 = 12°$; $\alpha^2_1 = \alpha^2_2 = 0°$; $\alpha^3_1 = \alpha^3_2 = 12°$.
$D^1_1 = D^2_1 = D^3_1 = 2.0$ mm.
Length of visible flame=4.5 m.
Width of visible flame=0.7 m.

Depending on the respective angles for the elementary atomizers and the relative diameter of the hollow elementary conduits C carrying the liquid fuel, it is also possible to obtain separate flames for each of the elementary atomizers., Thus, at the same fuel oil and atomizing air delivery rates, one has:

Device C (FIG. 18)
$\alpha^1_1 = \alpha^1_2 = 20°$; $\alpha^2_1 = \alpha^2_2 = 0°$; $\alpha^3_1 = \alpha^3_2 = 20°$.
$D^1_1 = D^2_1 = D^3_1 = 2.0$ mm.
Length of 3 separate visible flames=1.5 m.
Width of 3 separate visible flames=0.5 m.

F. Additional Characteristics of the Outer Nozzle Related to the Use of the Atomization Device in Glass Furnaces (FIGS. 19*a* and 19*b*)

In the case of continuous use of the inventive liquid fuel atomizer 200 in glass furnaces (combustion chambers with elevated temperatures ranging from 1500° C. to 1670° C.) the liquid fuel atomizer of the invention must be capable of ensuring production of a stable flame for periods on the order of months. The atomization principle selected makes it possible to keep the temperature of the metal parts composing the device below 1100° C. Thus, the temperature measured at the tip of the device during an industrial test for one month in a glass furnace at 1600° C. never exceeded 800° C.

These temperatures, which are not very high compared to the melting temperature of glass (~1350° C.), give rise to a condensation phenomenon by the vitreous materials present in glass furnaces.

To avoid the formation of a layer of glass condensates on the outside of outer nozzle 210, two symmetrical orifices 230, 232 are provided in the outer nozzle 210 (FIG. 19*a* and FIG. 19*b*) generally vertically aligned in a plane designated 240. The diameter $D_{OR}$ and the elevation $H_{OR}$ are established in such a way that the jet of atomizing fluid emerging from the orifices 230, 232 covers the entire surface of the exit end 209 of the outer nozzle 210.

Typically, $D_{OR}$~1 mm and $H_{OR}$~10 mm.

G. Control of the Flame Length at a Fixed Geometry

For a given geometry of the liquid fuel atomizer 200 of the present invention, it is possible to significantly vary the length of the flame (or flames) produced by a burner using this device. The flexibility (in terms of flame length at constant fuel delivery rate) observed when the liquid fuel atomizer 200 is deployed in a glass furnace corresponds to a ratio of one to three (flame length varying from about 3.7 to about 1.2 m).

This control of the flame length is achieved by increasing or decreasing the delivery rate of the atomizing fluid flowing between the outer nozzle 210 and the hollow elementary conduits C. This variation in delivery rate is directly linked to the variation in pressure of the atomizing fluid upstream from the liquid fuel atomizer 200.

In ordinary use, the liquid fuel atomizer 200 functions at an atomizing fluid pressure between about 1 and 6 bars relative. The higher the pressure of the atomizing fluid, the higher also will be the delivery rate of atomizing fluid and the shorter and "harder" the obtained flame (or flames) will be. This phenomenon is directly attributable to the change in the particle size distribution of the droplets of liquid fuel composing the spray that is formed: the increase in the rate of delivery of atomizing fluid has the effect of decreasing the average spray droplet diameter and narrowing the distribution of the diameters about this mean value. Conversely, a decrease in the rate of delivery of atomizing fluid will increase the average diameter while widening the distribution.

The overall mechanism of combustion of a liquid fuel reveals three characteristic times which, according to their respective weights, completely determine the type of flame resulting from a given atomization, These three characteristic times are: the evaporation time, the chemical time, and the hydrodynamic time. Obtaining a particle size distribution confined narrowly about small drop diameters leads to a decreased time for vaporization of the droplets and thus an increased rapidity of deflagration since the chemical time remains nearly constant. A spray characterized by such a distribution (high atomizing fluid delivery rate) will thus produce a short flame typical of a rapid combustion and very localized in space.

Preferred pressurized atomization fluids are employed, such as pressurized air, steam, water vapor, and the like.

III. Other Burner Assembly Embodiments

Figure 20A:
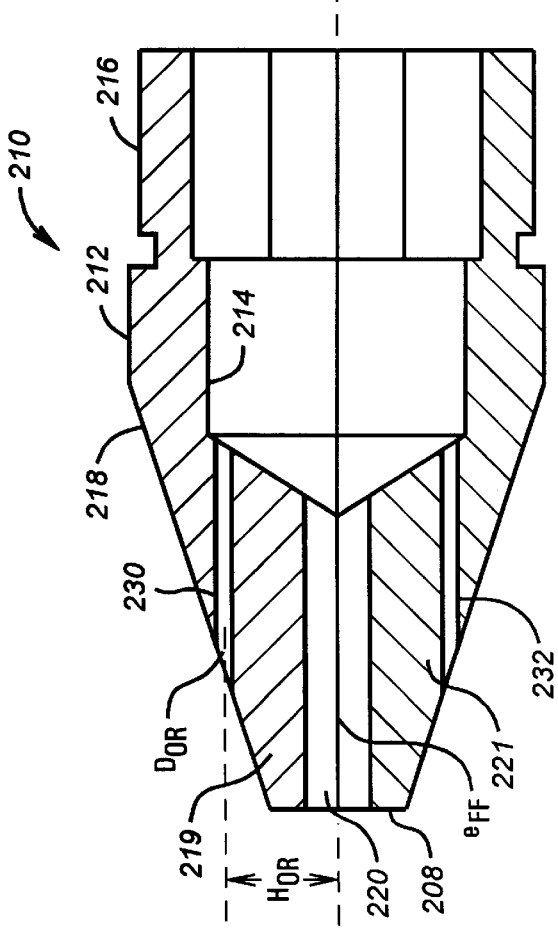
FIG. 20a is a schematic illustration of a refractory block and cavity in same.
Figure 20B:
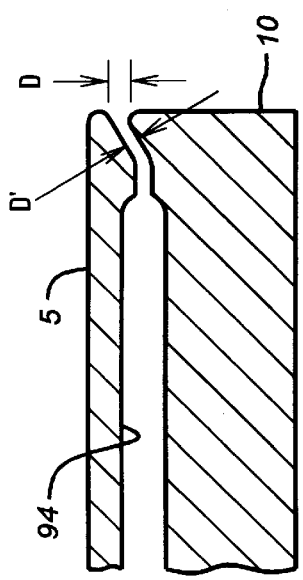
FIG. 20b is a schematic illustrating a preferred relationship between throat diameter and gas exit diameter for an injector or cavity.

FIG. 20*a* is a schematic illustration of a refractory block 5 and fuel gas cavity 94 in same, while FIG. 20*b* is a schematic illustrating a cavity throat diameter D' and gas exit diameter D for an injector or cavity. For fuel gas, the ratio of 1 (from FIG. 2, the distance between adjacent fuel gas exits) and D' (fuel cavity or injector throat diameter) ranges from about 1.5 to about 10, more preferably from about 1.5 to about 3, and most preferably about 2. FIG. 20a also illustrates that the cavities in the refractory block may have varying diameter in the direction of gas flow, and that the gas exits are generally contoured at the exits, allowing the exits to be less likely to be plugged.

Figure 21:
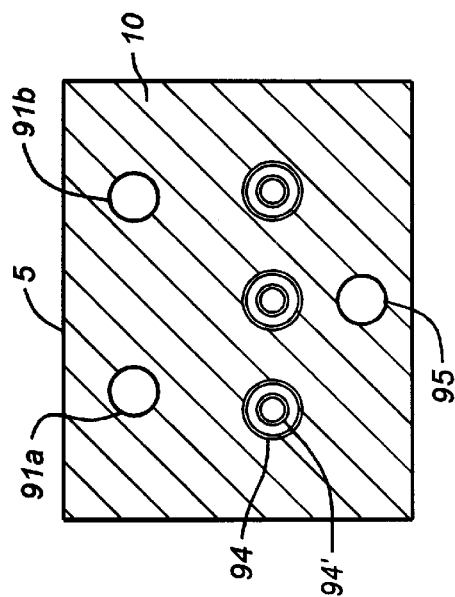

FIGS. 21 and 22 are gas exit end elevation views of two other refractory block embodiments within the invention, illustrating oxidant cavities 91a and 91b. The embodiment of FIG. 21 illustrates that the fuel gas cavities 94 may have concentric gas injectors in each cavity, whereby for example, fuel may injected in small diameter fuel gas injector 94' for low power operation, and through either the large diameter fuel gas injector 94 only, or through both injectors 94 and 94' for high power burner operation. Control of fuel flow between 94 and 94' may be controlled by suitable valving arrangements, or through the use of an orifice in the line feeding one or the other of 94 and 94'. A liquid fuel injector 95 is also illustrated.

FIG. 22 illustrates a very important alternative refractory block embodiment within the invention, wherein it has been discovered that flame stability is significantly increased when the peripheral oxidant injectors 91a and 91b, when positioned as illustrated, have a distance separating them of L, is greater than two times the distance 1 between adjacent fuel injectors, that is when L>21. This is true also when the fuel and oxidant are injected via the use only of injectors, rather than the use of a refractory block.

Figure 23:
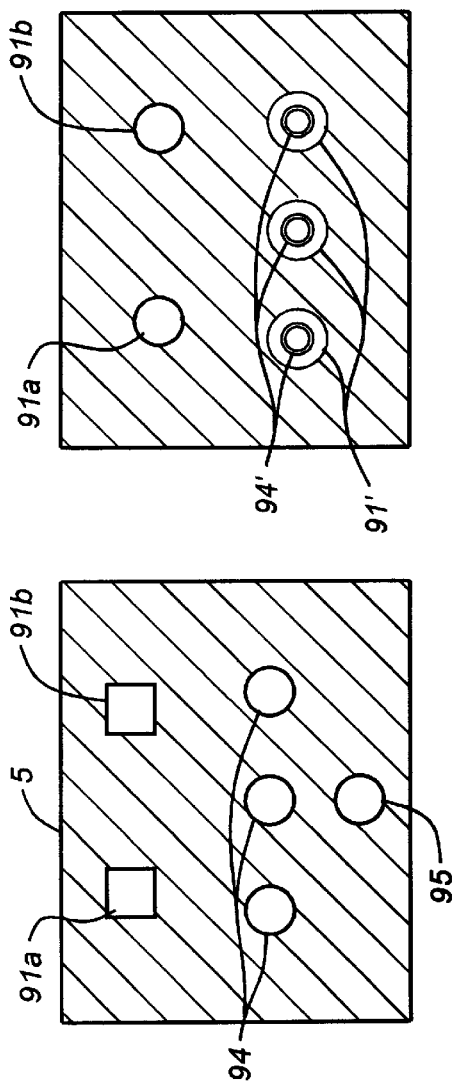

FIGS. 23–31 illustrate, in front elevation views, other embodiments of burner assemblies of the invention. FIG. 23 illustrates an embodiment wherein the two oxidant cavities 91a and 91b have exits which are rectangular, also illustrating three fuel gas exits 94 and a liquid fuel exit 95.

Figure 24:
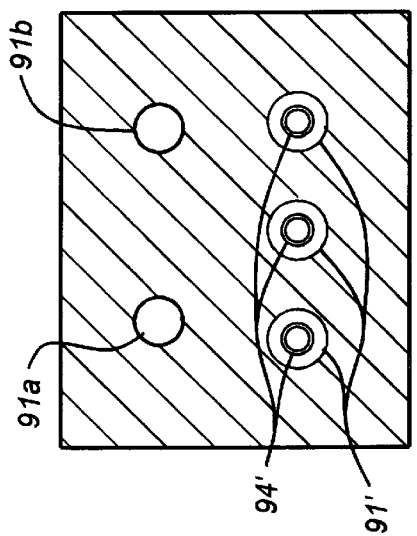

FIG. 24 illustrates an embodiment wherein oxidant emanates from two oxidant exits 91a and 91b, and oxidant also emanates from three annular portions 91' which surround respectively three fuel exits 94'.

Figure 25:
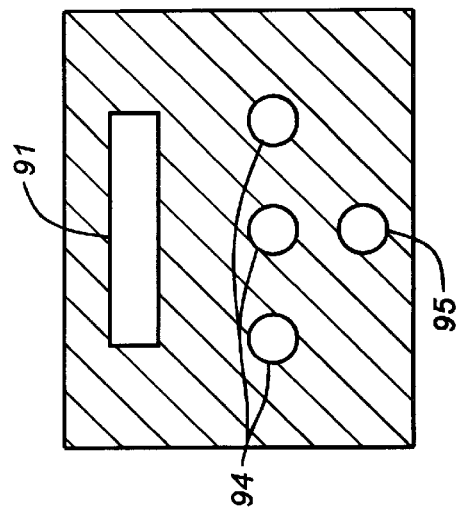

FIG. 25 illustrates an embodiment wherein a single oxidant exit 91 is present as a rectangle having a width much greater than its height. in this embodiment, the ratio of co width to height of the oxidant cavity exit may range from 1:1 up to about 4:1.

Figure 26:
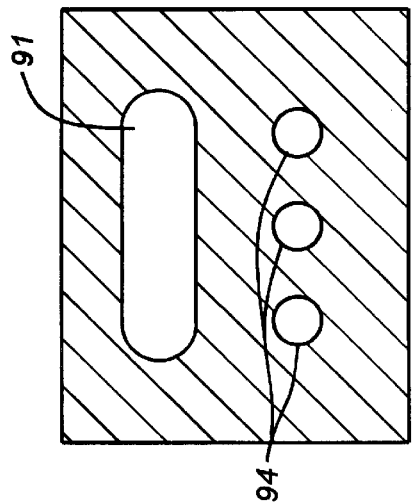

FIG. 26 illustrates an embodiment wherein the two oxidant cavities 91a and 91b have exits which are ellipsoid, also illustrating three fuel gas exits 94.

Figure 27:
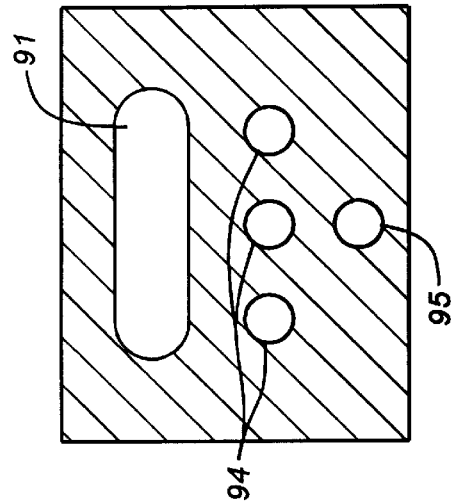

FIG. 27 illustrates an embodiment similar to the embodiment of FIG. 26, with the addition of a liquid fuel cavity 95 having a circular exit.

Figure 28:
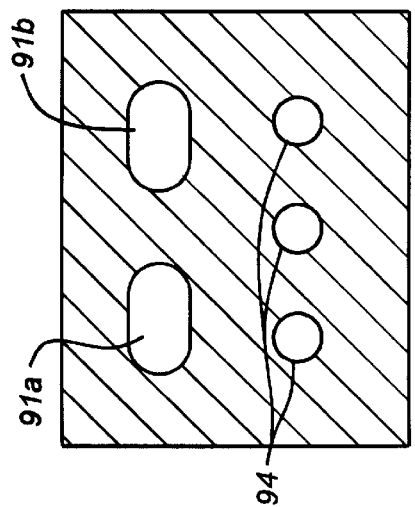

FIG. 28 illustrates an embodiment wherein a single ellipsoid oxidant exit 91 is present with three fuel gas cavities 94 having circular exits.

Figure 29:
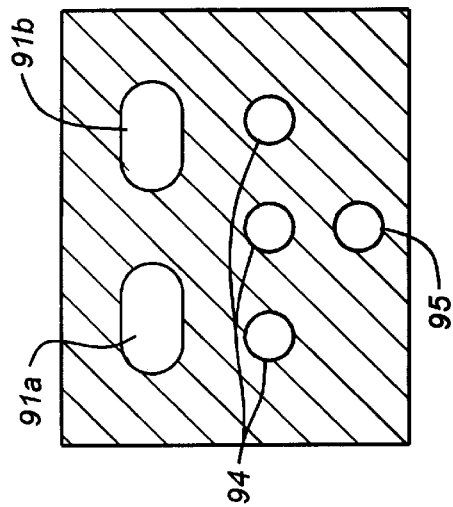

FIG. 29 illustrates an embodiment similar to the embodiment of FIG. 28, with the addition of a liquid fuel cavity 95 having a circular exit.

Figure 30:
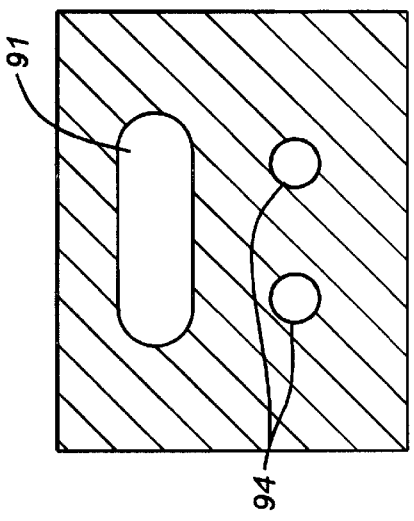

FIG. 30 illustrates an embodiment wherein a single ellipsoid oxidant exit 91 is present with two fuel gas cavities 94 having circular exits.

Figure 31:
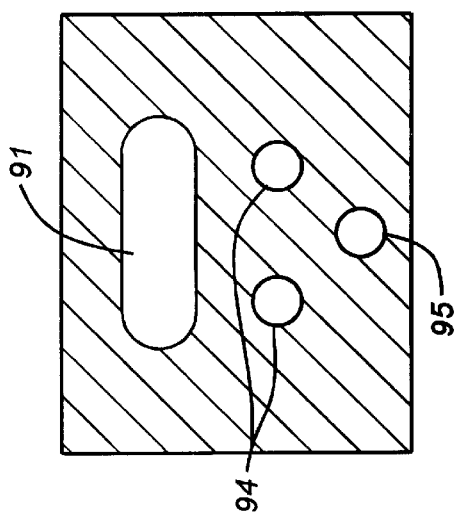

FIG. 31 illustrates an embodiment similar to the embodiment of FIG. 30 wherein a single ellipsoid oxidant exit 91 is present with two fuel gas cavities 94 having circular exits, with the addition of a liquid fuel cavity 95 having a circular exit.

Figure 32:
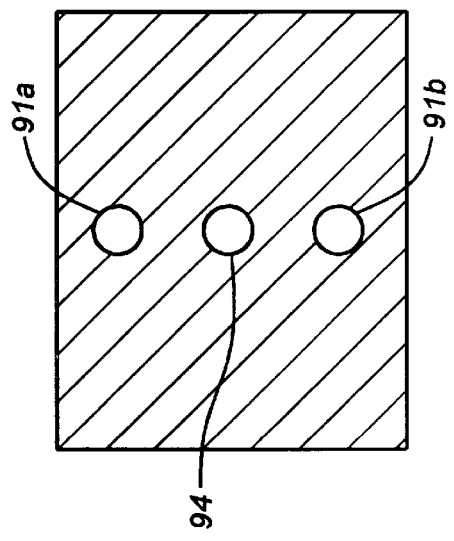
Figure 33:
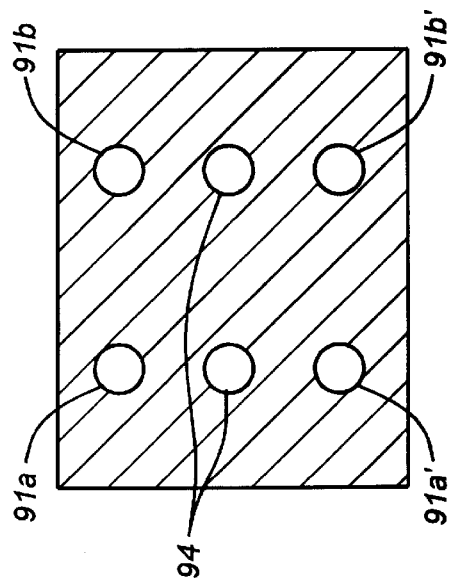

FIGS. 32 and 33 illustrate embodiments wherein oxidant emanates from one or more positions both above and below the fuel exit(s). In these embodiments, the fuel cavities are essentially parallel to the lower oxidant cavities, while the upper oxidant cavities are angled down so that the upper oxidant fluid flow converges with the fuel fluid flow and the lower oxidant fluid flows in the combustion chamber. Thus, in FIG. 32, duel oxidant exits 91a and 91b are positioned above and below, respectively, of a single fuel exit 94. FIG. 33 illustrates a similar embodiment, except that there are two oxidant exits 91a and 91b above two fuel exits 94, and two oxidant exits 91a' and 91b' below the duel fuel exits. More than two fuel exits, with corresponding upper and lower oxidant exits, can be envisioned.

Many other embodiments are possible and can easily be envisioned by the skilled artisan after having read and understood the above.

It is important to point out that the exits of oxidant and fuel in all embodiments are preferably contoured, as depicted for example in FIGS. 8–11.

Having described the present invention, it will be readily apparent to the artisan that many changes and modifications may be made to the above-described embodiments without departing from the spirit and the scope of the present invention.

What is claimed is:

1. A method of combustion of a fuel with an oxidant, the method comprising:
   a) providing a supply of an oxidant fluid stream;
   b) injecting said oxidant fluid stream into a combustion chamber to create at least one injected oxidant fluid stream;
   c) providing a supply of fuel fluid stream;
   d) injecting said fuel fluid stream into the combustion chamber to create at least two injected fuel fluid streams;
   e) creating a substantially planar sheet of fuel fluid in the combustion chamber by injecting the at least two injected fuel fluid streams into the combustion chamber, at least two of the injected fuel fluid streams being substantially located in a first fuel plane;
   f) intersecting the oxidant fluid stream with the sheet of fuel fluid in the combustion chamber; and
   g) combusting the fuel fluid with the oxidant fluid in the combustion chamber, wherein a major portion of the oxidant is injected in at least two oxidant fluid streams defining a second plane, said at least two oxidant streams in said second plane converging at a converging angle with said fuel streams in said first plane and intersecting with the fuel streams in the first fuel plane in the combustion chamber.

2. The method according to claim 1 wherein said converging angle is not more than 20°.

3. The method according to claim 1 wherein two adjacent oxidant fluid streams make a final diverging angle smaller than 15°.

4. A burner assembly comprising at least two fuel fluid cavities, at least one oxidant fluid cavity and at least one exit face at which at least one of the fuel fluid cavities and at least one of the oxidant fluid cavities terminates, comprising:
   a) means for supplying an oxidant fluid stream;
   b) means to inject said oxidant fluid stream in said at least one oxidant fluid cavity to create at least one injected oxidant fluid stream;
   c) means for supplying a fuel fluid stream;
   d) means to inject said fuel fluid stream in said at least two fuel fluid channels to create at least two injected fuel fluid streams; and e) wherein the directions of injection of the oxidant fluid stream and the fuel fluid stream are substantially converging and intersect at a combustion zone, while the directions of at least two adjacent fuel fluid channels are diverging.

5. A method of combustion of a fuel with an oxidant, the method comprising:

a) providing a supply of an oxidant fluid stream;

b) injecting said oxidant fluid stream into a combustion chamber to create at least one injected oxidant fluid stream;

c) providing a supply of a fuel fluid stream;

d) injecting said fuel fluid stream into the combustion chamber to create at least two injected fuel fluid streams;

e) creating a substantially planar sheet of fuel fluid in the combustion chamber by injecting the at least two injected fuel fluid streams into the combustion chamber, at least two of the injected fuel fluid streams being substantially located in first fuel plane;

f) intersecting the oxidant fluid stream with the sheet of fuel fluid in the combustion chamber;

g) combusting the fuel fluid with the oxidant fluid in the combustion chamber, wherein all of the oxidant is injected in at least two oxidant fluid streams defining a second plane, said at least two oxidant streams in said second plane converging at a converging angle with said fuel streams in said first plane and intersecting with the fuel streams in the first fuel plane in the combustion chamber.

6. A burner assembly having improved flame length and shape control, comprising:

a refractory block adapted to be in fluid connection with sources of oxidant and fuel, the refractory block having a fuel and oxidant entrance end and a fuel and oxidant exit end, the exit end having fuel exits and oxidant exits, the refractory block further having a plurality of fuel cavities, at least two of the fuel cavities defining a first fuel plane, and a plurality of oxidant cavities defining a second oxidant plane, wherein the first fuel plane is nearer a bottom of the refractory block than the second oxidant plane, the fuel cavities being more numerous than the oxidant cavities, the burner assembly including a mounting bracket assembly removably attached to the fuel and oxidant entrance end of the refractory block, the mounting bracket assembly having a gas distribution face, the burner assembly including a fuel distributor having multiple fuel injectors each fuel injector extending into a respective fuel cavity in said first fuel plane, wherein said fuel distributor is mounted directly on said mounting bracket assembly with means for fastening.

7. A burner assembly having improved flame length and shape control, comprising:

a refractory block adapted to be in fluid connection with sources of oxidant and fuel, the refractory block having a fuel and oxidant entrance end and a fuel and oxidant exit end, the exit end having fuel exits and oxidant exits, the refractory block further having a plurality of fuel cavities, at least two of the fuel cavities defining a first fuel plane, and a plurality of oxidant cavities defining a second oxidant plane, wherein the first fuel plane is nearer a bottom of the refractory block than the second oxidant plane, the fuel cavities being more numerous than the oxidant cavities, the burner assembly including a mounting bracket assembly removably attached to the fuel and oxidant entrance end of the refractory block, the mounting bracket assembly having a gas distribution face, the burner assembly including a fuel distributor having multiple fuel injectors, each fuel injector extending into a respective fuel cavity in said first fuel plane, the fuel distributor and fuel injectors being a single, integral component.

* * * * *

UNITED STATES PATENT AND TRADEMARK OFFICE
CERTIFICATE OF CORRECTION

PATENT NO : 5,984,667
DATED : NOV. 16, 1999
INVENTOR(S): PHILIPPE et al.

It is certified that error appears in the above-identified patent and that said Letters Patent are hereby corrected as shown below:

In claim 1, line 27, after the word "fluid" please insert therefor --in an oxidant fluid--

In claim 1, line 31, after the words "supply of" please insert therefore --a-- and after the words "fuel fluid" please insert --in a fuel fluid--.

In claim 1, line 48, after the word "first" please insert therefor the word --fuel--.

Signed and Sealed this

Third Day of April, 2001

*Attest:*

NICHOLAS P. GODICI

*Attesting Officer*     Acting Director of the United States Patent and Trademark Office